(12) United States Patent
Ohsugi et al.

(10) Patent No.: US 9,550,493 B2
(45) Date of Patent: Jan. 24, 2017

(54) TRANSPORTER VEHICLE AND TRANSPORTER VEHICLE CONTROL METHOD

(71) Applicant: Komatsu Ltd., Tokyo (JP)

(72) Inventors: Shigeru Ohsugi, Hiratsuka (JP); Shinji Mitsuta, Hiratsuka (JP); Hiroyuki Watanabe, Hitachinaka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/430,335

(22) PCT Filed: Sep. 1, 2014

(86) PCT No.: PCT/JP2014/072941
§ 371 (c)(1),
(2) Date: Mar. 23, 2015

(87) PCT Pub. No.: WO2015/025984
PCT Pub. Date: Feb. 26, 2015

(65) Prior Publication Data
US 2016/0059854 A1   Mar. 3, 2016

(51) Int. Cl.
*B60W 10/20* (2006.01)
*B60W 30/095* (2012.01)
(Continued)

(52) U.S. Cl.
CPC ............ *B60W 30/095* (2013.01); *B60W 10/18* (2013.01); *B60W 10/20* (2013.01); *B60W 30/085* (2013.01);
(Continued)

(58) Field of Classification Search
CPC ........... G08G 1/16; B60W 10/20; G01S 13/00
(Continued)

(56) References Cited

U.S. PATENT DOCUMENTS 5,467,284 A * 11/1995 Yoshioka ................. B62D 1/28
180/169
6,008,751 A * 12/1999 Kudoh .................. G01S 13/931
342/70
(Continued)

FOREIGN PATENT DOCUMENTS

JP   2003-141692 A   5/2003
JP   2003-157498 A   5/2003
(Continued)

OTHER PUBLICATIONS

International Search Report mailed Dec. 2, 2014, issued for PCT/JP2014/072941.

*Primary Examiner* — Tan Q Nguyen
(74) *Attorney, Agent, or Firm* — Locke Lord LLP; James E. Armstrong, IV; Howard M. Gitten

(57) ABSTRACT

A transporter vehicle includes: a vehicle; an object detection device which includes a detection area at a front side of the vehicle and detects an object at the front side of the vehicle; a process system capable of performing a process for reducing damage caused by a collision; a specific detection area setting unit which sets a specific detection area having a width of a first dimension in a width direction of the vehicle and a length of a second dimension in a traveling direction of the vehicle in the detection area; a collision determination unit which determines whether an object exists in the specific detection area based on a detection result of the object detection device; and a control unit which outputs a signal for reducing damage caused by the collision to the process system based on a determination result of the collision determination unit.

17 Claims, 23 Drawing Sheets

(51) Int. Cl.
*B60W 30/085* (2012.01)
*B60W 10/18* (2012.01)
*G08G 1/16* (2006.01)
*B60W 50/14* (2012.01)

(52) U.S. Cl.
CPC .... *B60W 2050/143* (2013.01); *B60W 2520/10* (2013.01); *B60W 2550/10* (2013.01); *B60W 2710/18* (2013.01); *B60W 2720/24* (2013.01)

(58) Field of Classification Search
USPC 701/50, 96, 300, 301; 340/435, 436; 342/70
See application file for complete search history.

(56) References Cited

U.S. PATENT DOCUMENTS

| | | | | |
|---|---|---|---|---|
| 6,943,727 | B2* | 9/2005 | Meinecke | G01S 13/583 340/933 |
| 7,132,976 | B2* | 11/2006 | Shinoda | G01S 7/2925 342/118 |
| 7,663,537 | B2* | 2/2010 | Suzuki | G01S 3/74 342/118 |
| 7,973,700 | B2* | 7/2011 | Gohl | H01Q 1/3208 342/118 |
| 2003/0083818 | A1 | 5/2003 | Tojima | |
| 2005/0171675 | A1* | 8/2005 | Sawamoto | B60K 31/0008 701/96 |
| 2005/0225636 | A1 | 10/2005 | Maemura et al. | |
| 2008/0169966 | A1 | 7/2008 | Tsuchihashi et al. | |
| 2012/0139715 | A1* | 6/2012 | Yamazato | G08G 1/166 340/436 |
| 2014/0358382 | A1 | 12/2014 | Kou et al. | |
| 2015/0291158 | A1* | 10/2015 | Okita | B60T 8/17558 701/1 |
| 2015/0329046 | A1* | 11/2015 | Igarashi | G08G 1/165 340/435 |

FOREIGN PATENT DOCUMENTS

| | | |
|---|---|---|
| JP | 2005-276056 A | 10/2005 |
| JP | 2008-064743 A | 3/2008 |
| JP | 2009-271766 A | 11/2009 |
| JP | 2012-014265 A | 1/2012 |
| JP | 2013-133094 A | 7/2013 |
| JP | 2013-249002 A | 12/2013 |
| WO | WO-2013/136588 A1 | 9/2013 |
| WO | WO-2014/080483 A1 | 5/2014 |

* cited by examiner

TRANSPORTER VEHICLE AND TRANSPORTER VEHICLE CONTROL METHOD

FIELD

The present invention relates to a transporter vehicle and a transporter vehicle control method.

BACKGROUND

A collision damage reduction system has been used in order to reduce damage caused by the collision between a vehicle and an object. The collision damage reduction system includes an object detection device which is mounted on a vehicle and detects an object at the front side of the vehicle and a process system which performs a process for reducing damage caused by the collision. As the object detection device, for example, a radar device and a camera are known. As the process system, an alarm device generating an alarm and a brake assist device assisting a brake operation are known. Patent Literature 1 discloses an example of a technique involving with an in-vehicle laser device.

CITATION LIST

Patent Literature

Patent Literature 1: Japanese Unexamined Patent Application Publication No. 2008-064743

SUMMARY

Technical Problem

In a mining site of a mine, a transporter vehicle such as a dump truck is operated. The transporter vehicle transports crushed stones or the like. When the transporter vehicle collides with the object in the traveling state, the transporter vehicle is damaged, and hence the operation of transporting crushed stones or the like is disturbed. As a result, there is a possibility that the productivity in the mining site may be degraded. For that reason, there is a need to apply the collision damage reduction system to even the transporter vehicle which is operated in the mining site. However, there is a possibility that the object detection device may detect an object having a low possibility of the collision. When the traveling operation of the transporter vehicle is excessively limited by the operation of the process system of the collision damage reduction system even when the object having a low possibility of the collision is detected, the work efficiency of the transporter vehicle is degraded, and hence there is a possibility that the productivity of the mining site may be degraded.

An aspect of the invention is to provide a transporter vehicle capable of suppressing an excessive operation of a process system of a collision damage reduction system and suppressing degradation in work efficiency while reducing damage caused by the collision with an object by detecting an object having a high possibility of the collision and to provide a transporter vehicle control method.

Solution to Problem

According to a first aspect of the invention, there is provided a transporter vehicle comprising: a vehicle; an object detection device which includes a detection area at a front side of the vehicle and detects an object at the front side of the vehicle; a process system which performs a process for reducing damage caused by a collision; a specific detection area setting unit which sets a specific detection area having a width of a first dimension in a width direction of the vehicle and a length of a second dimension in a traveling direction of the vehicle in the detection area; a collision determination unit which determines whether the object exists in the specific detection area based on a detection result of the object detection device; and a control unit which outputs a signal for reducing damage caused by the collision to the process system based on a determination result of the collision determination unit.

According to a second aspect of the invention, there is provided a transporter vehicle comprising: a vehicle; an object detection device which includes a detection area at a front side of the vehicle and detects an object at the front side of the vehicle; a process system capable of performing a process for reducing damage caused by a collision; a specific detection area setting unit which sets a specific detection area having a width of a first dimension in a width direction of the vehicle and a length of a second dimension in a traveling direction of the vehicle in the detection area based on a detection result of the object detection device; a collision determination unit which determines whether an object exists in the specific detection area based on a detection result of the object detection device; and a control unit which outputs a signal for reducing damage caused by the collision to the process system based on a determination result of the collision determination unit, wherein the first dimension includes a dimension of a vehicle width of the vehicle, and the specific detection area setting unit changes a shape of the specific detection area based on a traveling condition of the vehicle.

According to a third aspect of the invention, there is provided a transporter vehicle control method comprising: detecting an object at a front side of a transporter vehicle by an object detection device which is provided in the transporter vehicle and includes a detection area at the front side of the transporter vehicle; setting a specific detection area having a width of a first dimension in a width direction of the vehicle and a length of a second dimension in a traveling direction of the vehicle in the detection area based on a detection result of the object detection device; determining whether an object exists in the specific detection area based on the detection result of the object detection device; and outputting a signal for reducing damage caused by a collision to a process system capable of performing a process for reducing the damage caused by the collision based on a determination result of the collision determination unit.

Advantageous Effects of Invention

According to the aspect of the invention, it is possible to provide a transporter vehicle and a transporter vehicle control method capable of suppressing degradation in work efficiency while reducing damage caused by the collision with an object.

DESCRIPTION OF EMBODIMENTS

Hereinafter, embodiments of the invention will be described with reference to the drawings, but the invention is not limited thereto. The components of the embodiments described below may be appropriately combined. Further, a part of the components may not be used in some cases.

(Mining Site of Mine)

Figure 1:
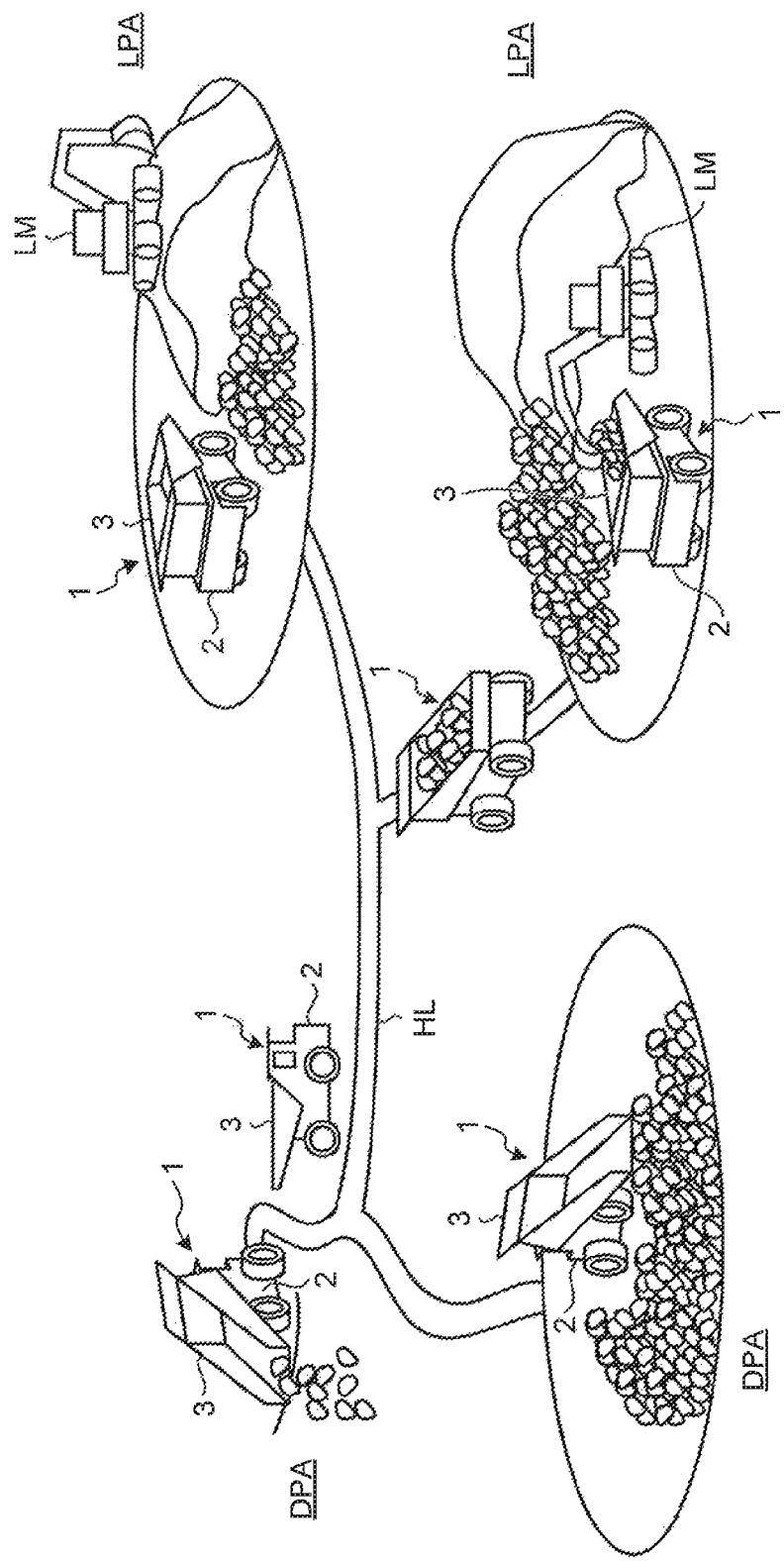
FIG. 1 is a schematic diagram illustrating an example of a mining site of a mine.

FIG. 1 is a schematic diagram illustrating an example of a mining site of a mine where a transporter vehicle according to the embodiment works. The transporter vehicle is a dump truck 1 that includes a vehicle 2 and a vessel 3 provided in the vehicle 2. The dump truck 1 transports a load loaded on the vessel 3. The load includes mined crushed stone or at least one of soil and ore.

In the mining site of the mine, a traveling road HL is provided so as to be connected to a loading field LPA and a soil disposal field DPA or at least one of the loading field LPA and the soil disposal field DPA. The dump truck 1 may travel on at least one of the loading field LPA, the soil disposal field DPA, and the traveling road HL. The dump truck 1 may move between the loading field LPA and the soil disposal field DPA while traveling along the traveling road HL. Furthermore, the traveling road HL of the mining site of the mine is an unpaved road in many cases.

In the loading field LPA, a load may be loaded on the vessel 3. The load may be loaded on the vessel 3 by a loading machine LM. An excavator or a wheel loader is used as the loading machine LM. The dump truck 1 on which the load is loaded travels along the traveling road HL from the loading field LPA to the soil disposal field DPA. In the soil disposal field DPA, a load is discharged from the vessel 3. The dump truck 1 from which the load is discharged travels along the traveling road HL from the soil disposal field DPA to the loading field LPA. Furthermore, the dump truck 1 may travel from the soil disposal field DPA to a predetermined waiting station.

(Dump Truck)

Figure 2:
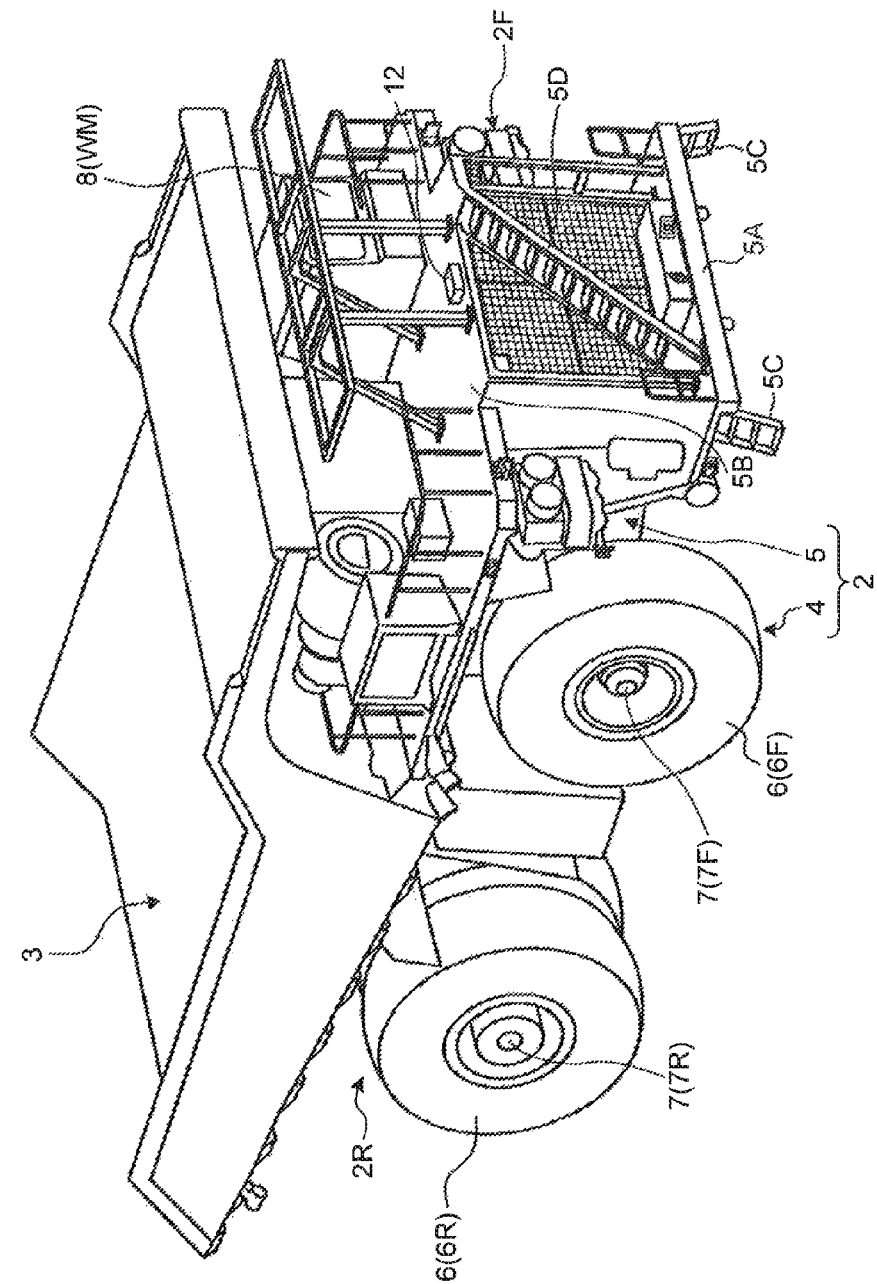
FIG. 2 is a perspective view illustrating an example of a transporter vehicle.

Next, the dump truck 1 will be described. FIG. 2 is a perspective view illustrating an example of the dump truck 1 according to the embodiment.

The dump truck 1 is a manned dump truck which is operated by a driver (operator) WM sitting in a cab (a driving room) 8. The dump truck 1 may be referred to as an off-highway truck. The dump truck 1 is a rigid dump truck 1.

The dump truck 1 includes the vehicle 2 which includes a front part 2F and a rear part 2R and the vessel 3 which is provided in the vehicle 2. The vehicle 2 includes a traveling device 4 and a vehicle body 5 of which at least a part is disposed above the traveling device 4. The vessel 3 is supported by the vehicle body 5.

The traveling device 4 includes a vehicle wheel 6 and an axle 7 which rotatably supports the vehicle wheel 6. The vehicle wheel 6 includes a wheel which is supported by the axle 7 and a tire which is supported by the wheel. The vehicle wheel 6 includes a front wheel 6F and a rear wheel 6R. The front wheel 6F includes one tire at each of the right and left sides. The rear wheel 6R includes two tires at each of right and left sides. Accordingly, the traveling device 4 includes four tires in the entire rear wheel 6R. The axle 7 includes an axle 7F which rotatably supports the front wheel 6F and an axle 7R which rotatably supports the rear wheel 6R.

The vehicle body 5 includes a lower deck 5A, an upper deck 5B, a movable ladder 5C which is disposed below the lower deck 5A, and a ladder 5D which is disposed so as to connect the lower deck 5A and the upper deck 5B. The lower deck 5A is disposed at the lower portion of the front part of the vehicle body 5. The upper deck 5B is disposed above the lower deck 5A in the front part of the vehicle body 5.

The vehicle 2 includes a cab 8. The cab 8 is disposed on the upper deck 5B. The operator WM sits in the cab 8, and operates the dump truck 1. The operator WM may be elevated with respect to the cab 8 by using the ladder 5C. The operator WM may move between the lower deck 5A and the upper deck 5B by using the ladder 5D.

The vessel 3 is a member on which a load is loaded. The vessel 3 may be elevated in the vertical direction with respect to the vehicle 2 by an elevation device. The elevation device includes an actuator such as a hydraulic cylinder (a hoist cylinder) disposed between the vessel 3 and the vehicle body 5. When a part of the vessel 3 is moved upward by the elevation device, the load of the vessel 3 is discharged.

(Cab)

Figure 3:
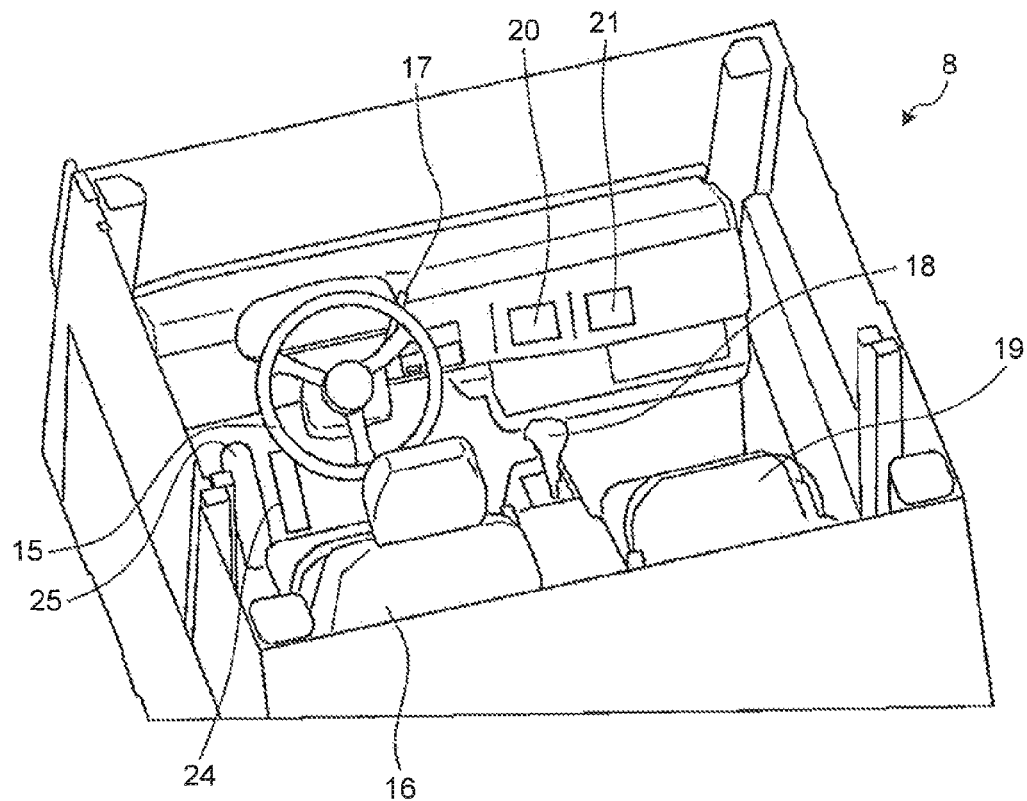
FIG. 3 is a diagram illustrating an example of a cab.

Next, the cab 8 will be described. FIG. 3 is a diagram illustrating an example of the cab 8 according to the embodiment. The cab 8 is provided with a plurality of operation devices which are operated by the operator WM sitting on the cab 8. As illustrated in FIG. 3, the cab 8 is provided with a driver seat 16, a trainer seat 19, an output operation unit 24, a brake operation unit 25, a traveling direction operation unit 15, a speed stage operation unit 18, a retarder operation unit 17, a display device 20 such as a flat panel display, and an alarm device 21 which generates an alarm. An operation device which is operated by the operator WM includes at least one of the output operation unit 24, the brake operation unit 25, the traveling direction operation unit 15, the speed stage operation unit 18, and the retarder operation unit 17.

(Collision Damage Reduction System)

Next, a collision damage reduction system 300S according to the embodiment will be described. In the embodiment, the dump truck 1 includes the collision damage reduction system 300S capable of performing a process for reducing damage caused by the collision between the dump truck 1 and an object in front of the dump truck 1.

Figure 4:
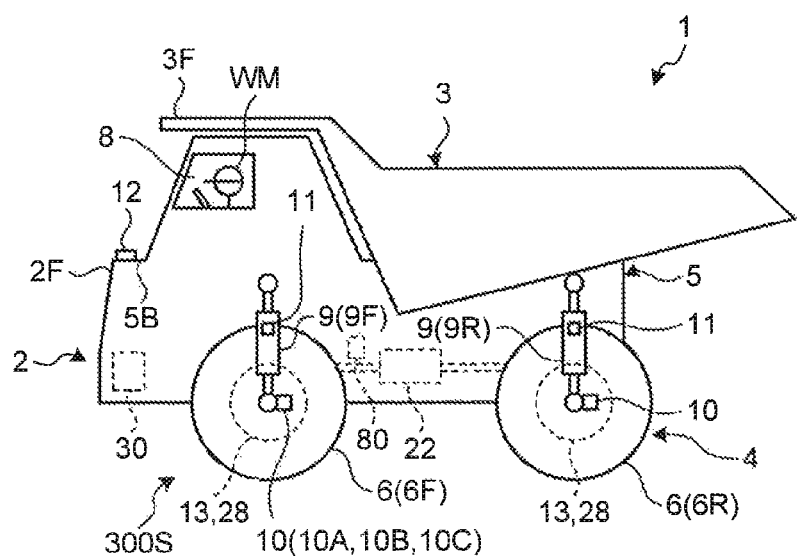
FIG. 4 is a schematic diagram illustrating an example of the transporter vehicle.
Figure 5:
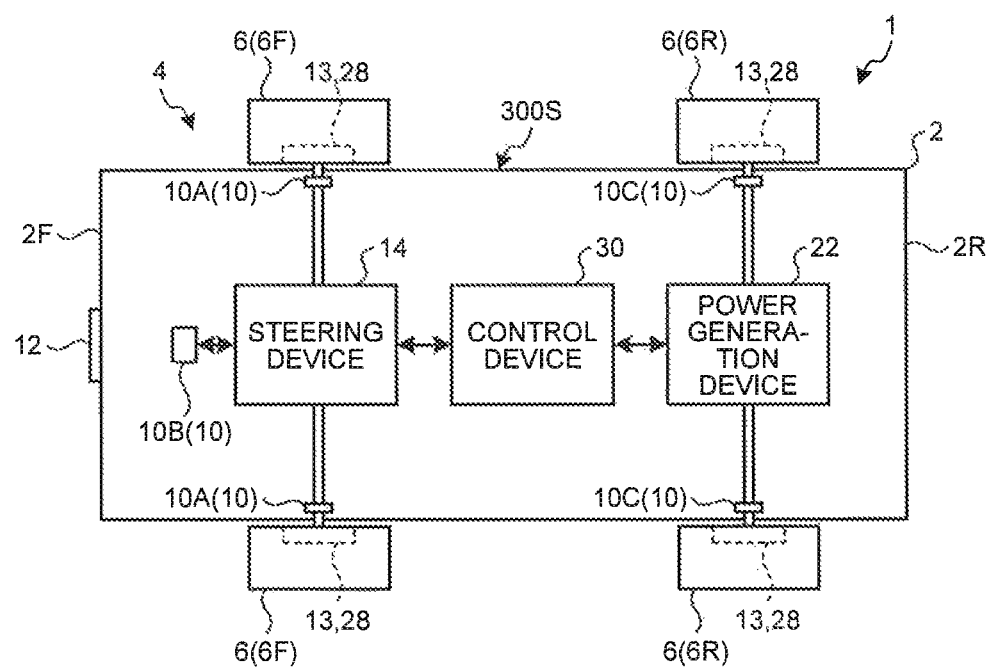
FIG. 5 is a schematic diagram illustrating an example of the transporter vehicle.

FIGS. 4 and 5 are schematic views illustrating an example of the dump truck 1 according to the embodiment. The dump truck 1 includes a traveling state detection device 10 which detects the traveling state of the dump truck 1 (the vehicle 2), a loading state detection device 11 which detects the loading state of the load of the vessel 3, an object detection device 12 which detects an object in front of the dump truck 1 (the vehicle 2), and a control device 30 which controls the dump truck 1. The collision damage reduction system 300S includes the object detection device 12. The detection result of the traveling state detection device 10, the detection result of the loading state detection device 11, and the detection result of the object detection device 12 are output to the control device 30. The control device 30 performs a process for preventing the collision between the dump truck 1 and the object based on the detection result.

The traveling state of the dump truck 1 includes at least one of the traveling speed of the dump truck 1, the traveling direction (the direction of the front part 2F or the front wheel 6F) of the dump truck 1, and the advancing direction (the forward or backward movement direction) of the dump truck 1.

The loading state of the load of the vessel 3 includes at least one of the state where a load is loaded on the vessel 3 and the weight of the load loaded on the vessel 3.

The dump truck 1 includes a power generation device 22 which generates a power, a suspension cylinder 9 of which a part is connected to the traveling device 4, a brake device 13 which stops the traveling device 4, and a speed change device 80. Furthermore, the speed change device 80 may not be provided in the case of the electrically driven dump truck 1 to be described later.

The traveling device 4 is driven by the power generated by the power generation device 22. The power generation device 22 drives the traveling device 4 in an electrical drive manner. The power generation device 22 includes an internal-combustion engine such as a diesel engine, a generator which is operated by the power of the internal-combustion engine, and a motor which is operated by the power generated by the generator. The power which is generated by the motor is transmitted to the vehicle wheel 6 of the traveling device 4. Accordingly, the traveling device 4 is driven. The self-running operation of the dump truck 1 is performed by the power of the power generation device 22 provided in the vehicle 2.

Furthermore, the power generation device 22 may drive the traveling device 4 in a mechanical drive manner. For example, the power which is generated by the internal-combustion engine may be transmitted to the vehicle wheel 6 of the traveling device 4 through a power transmission device. In the embodiment, the mechanically driven dump truck 1 will be exemplified.

The traveling device 4 includes a steering device 14 which changes the traveling direction (the direction of the front part 2F) of the dump truck 1. The steering device 14 changes the traveling direction of the dump truck 1 by changing the direction of the front wheel 6F.

The power generation device 22 is operated by the output operation unit 24 provided in the cab 8. The output operation unit 24 includes a pedal operation unit such as an accelerator pedal. The operator WM may adjust the output of the power generation device 22 by operating the output operation unit 24. When the output of the power generation device 22 is adjusted, the traveling speed of the dump truck 1 is adjusted.

The brake device 13 is operated by the brake operation unit 25 provided in the cab 8. The brake operation unit 25 includes a pedal operation unit such as a brake pedal. The operator WM may operate the brake device 13 by operating the brake operation unit 25. When the brake device 13 is operated, the traveling speed of the dump truck 1 is adjusted.

The steering device 14 is operated by the traveling direction operation unit 15 provided in the cab 8. The traveling direction operation unit 15 is, for example, a handle, and includes a handle operation unit. The operator WM may operate the steering device 14 by operating the traveling direction operation unit 15. When the steering device 14 is operated, the traveling direction of the dump truck 1 is adjusted.

Further, the speed change device 80 is, for example, a transmission, and is operated by the speed stage operation unit 18 provided in the cab 8. The speed stage operation unit 18 includes a lever operation unit such as a shift lever. The operator WM may change the advancing direction of the traveling device 4 by operating the speed stage operation unit 18. When the speed stage operation unit 18 is operated, the speed change device 80 changes the rotation direction of the vehicle wheel 6 in order to cause the dump truck 1 to move forward or backward.

The suspension cylinder 9 is disposed between the vehicle wheel 6 and the vehicle body 5. The suspension cylinder 9 includes a suspension cylinder 9F which is disposed between the front wheel 6F and the vehicle body 5 and a suspension cylinder 9R which is disposed between the rear wheel 6R and the vehicle body 5. That is, the suspension cylinder 9 is provided in each of the vehicle wheels 6 disposed at the front, rear, left, and right positions. A load based on the weight of the vehicle body 5 and the load acts on the vehicle wheel 6 through the suspension cylinder 9.

The traveling state detection device 10 includes a traveling speed detection device 10A which detects the traveling speed of the dump truck 1, a traveling direction detection device 10B which detects the traveling direction of the dump truck 1, and an advancing direction detection device 10C which detects whether the dump truck 1 moves forward or backward.

The traveling speed detection device 10A detects the traveling speed of the dump truck 1 (the vehicle 2). The traveling speed detection device 10A includes a rotation speed sensor which detects the rotation speed of the vehicle wheel 6 (the axle 7). The rotation speed of the vehicle wheel 6 is involved with the traveling speed of the dump truck 1. The detection value (the rotation speed value) of the rotation speed sensor is converted into the traveling speed value of the dump truck 1. The traveling speed detection device 10A detects the traveling speed of the dump truck 1 based on the detection value of the rotation speed sensor.

The traveling direction detection device 10B detects the traveling direction of the dump truck 1 (the vehicle 2). The traveling direction of the dump truck 1 includes the direction of the front part (the front surface) 2F of the vehicle 2 when the dump truck 1 moves forward. The traveling direction of the dump truck 1 includes the direction of the front wheel 6F when the dump truck 1 moves forward. The traveling direction detection device 10B includes a steering sensor which detects the steering angle of the steering device 14. For example, a rotary encoder may be used as the steering sensor. The traveling direction detection device 10B detects the steering angle by detecting the operation amount of the steering device 14. The traveling direction detection device 10B detects the traveling direction of the dump truck 1 by using the steering sensor. Furthermore, the traveling direction detection device 10B may include a rotation amount sensor which detects the steering angle or the rotation amount of the traveling direction operation unit 15. That is, the steering angle of the traveling direction operation unit 15 involves with the steering angle of the steering device 14 of the dump truck 1.

The advancing direction detection device 10C detects the advancing direction of the dump truck 1 (the vehicle 2). The advancing direction detection device 10C detects whether the dump truck 1 moves forward or backward. When the dump truck 1 moves forward, the front part 2F of the vehicle 2 is located at the front side in the advancing direction. When the dump truck 1 moves backward, the rear part 2R of the vehicle 2 is located at the front side in the advancing direction. The advancing direction detection device 10C includes a rotation direction sensor which detects the rotation direction of the vehicle wheel 6 (the axle 7). The advancing direction detection device 10C detects whether the dump truck 1 moves forward or backward based on the detection value of the rotation direction sensor. Furthermore, the advancing direction detection device 10C may include a sensor which detects the operation state of the speed stage operation unit 18.

The loading state detection device 11 detects at least one of the state where a load is loaded on the vessel 3 and the weight of the load loaded on the vessel 3. The loading state detection device 11 includes a weight sensor which detects the weight of the vessel 3. The weight of the empty vessel 3 is given information. The loading state detection device 11 may obtain the weight of the load loaded on the vessel 3 based on the detection value of the weight sensor and the weight value of the empty vessel 3 as given information. That is, the loading state detection device 11 may obtain the weight of the load loaded on the vessel 3 by subtracting the weight value of the vessel 3 from the detection value.

In the embodiment, the weight sensor of the loading state detection device 11 includes a pressure sensor which detects the pressure of the working oil in the space inside the suspension cylinder 9. The pressure sensor detects a load acting on the suspension cylinder 9 by detecting the pressure of the working oil. The suspension cylinder 9 includes a cylinder portion and a piston portion which is movable relative to the cylinder portion. The working oil is enclosed in the inner space between the cylinder portion and the piston portion. When a load is loaded on the vessel 3, the cylinder portion and the piston portion move relatively so that the pressure of the working oil in the inner space increases. When a load is discharged from the vessel 3, the cylinder portion and the piston portion move relatively so that the pressure of the working oil in the inner space decreases. The pressure sensor detects the pressure of the working oil. The pressure of the working oil is involved with the weight of the load. The detection value (the pressure value) of the pressure sensor is converted into the weight of the load value. The loading state detection device 11 detects the weight of the load based on the detection value of the pressure sensor (the weight sensor).

In the embodiment, the pressure sensor is disposed in each of the plurality of suspension cylinders 9. The dump truck 1 includes four vehicle wheels 6. The pressure sensor is disposed in each of the suspension cylinders 9 provided in four vehicle wheels 6. The loading state detection device 11 may obtain the weight of the load based on the sum value or the average value of the detection values of four pressure sensors. The loading state detection device 11 may obtain the weight of the load based on the detection value of a specific pressure sensor (for example, the pressure sensor disposed in the suspension cylinder 9R) among four pressure sensors.

Furthermore, the load transportation amount of the dump truck 1 per unit time may be managed based on the detection result of the pressure sensor (the weight sensor) of the loading state detection device 11. For example, the load transportation amount (the work amount) of the dump truck 1 for one day may be stored in a storage device mounted on the dump truck 1 based on the detection result of the pressure sensor.

Furthermore, the loading state detection device 11 may be configured as a weight sensor disposed between the vessel 3 and the vehicle body 5. The weight sensor may be a strain gauge type load cell provided between the vessel 3 and the vehicle body 5. The loading state detection device 11 may be configured as a pressure sensor which detects the hydraulic pressure of the hydraulic cylinder (the hoist cylinder) detecting the hydraulic pressure of raising the vessel 3.

The object detection device 12 detects an object existing in front of the dump truck 1 (the vehicle 2) in a non-contact state. The object detection device 12 includes a radar device (a millimeter wave radar device). The radar device may detect the object existing at the front side by sending an electric wave (or an ultrasonic wave) and receiving the electric wave (or the ultrasonic wave) reflected from the object. Further, the radar device may detect not only the existence of the object, but also the relative position (the relative distance and the orientation) with respect to the object and the relative speed with respect to the object. Furthermore, the object detection device 12 may include at least one of a laser scanner and a three-dimensional distance sensor. Further, the object detection device 12 may be provided at a plurality of positions.

The object detection device 12 is disposed in the front part 2F of the vehicle 2. In the embodiment, as illustrated in FIG. 2, the object detection device 12 is disposed in the upper deck 5B. Furthermore, the object detection device 12 may detect the object in front of the dump truck 1. The object detection device 12 may be disposed in the lower deck 5A.

Furthermore, since the upper deck 5B is provided with the object detection device 12, it is possible to prevent a problem in which unevenness existing on a road surface (a ground surface) contacting the vehicle wheel 6 is erroneously detected as an object by the object detection device 12 even when the unevenness exists. Furthermore, when an electric wave is emitted from the radar device, the strength of the electric wave emitted from the unevenness of the road surface is smaller than the strength of the electric wave reflected from the object as the detection target. The radar device may include a filter device which receives a large-strength electric wave and cuts a low-strength electric wave so that the electric wave reflected from the object is received and the electric wave reflected from the unevenness of the road surface is not erroneously detected.

Figure 6:
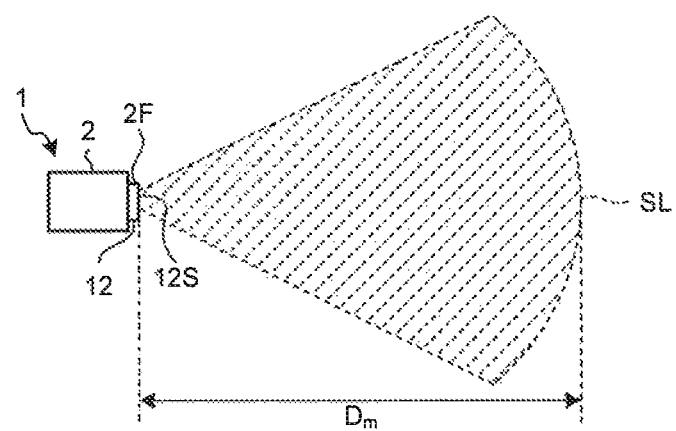
FIG. 6 is a schematic diagram illustrating an example of an object detection device.

FIG. 6 is a schematic diagram illustrating an example of the object detection device 12 according to the embodiment. As illustrated in FIG. 6, the object detection device 12 includes a radar device (a millimeter wave radar device) which is disposed in the front part 2F of the vehicle 2. The radar device includes a detection area SL at the front side of the vehicle 2. The radar device may detect the object disposed at the front side of the dump truck 1 (the vehicle 2) and disposed in the detection area SL. As indicated by the diagonal line of FIG. 6, the detection area SL is widened in a radial shape in each of the up and down direction and the right and left direction from a light emission portion 12S. The object detection device 12 may detect an object existing in the detection area SL. In the traveling direction of the dump truck 1, the dimension of the detection area SL of the object detection device 12 is indicated by Dm. The dimension Dm is a distance between the front end of the detection area SL and the light emission portion 12S of the object detection device 12 emitting at least one of an electric wave and an ultrasonic wave.

(Control System)

Figure 7:
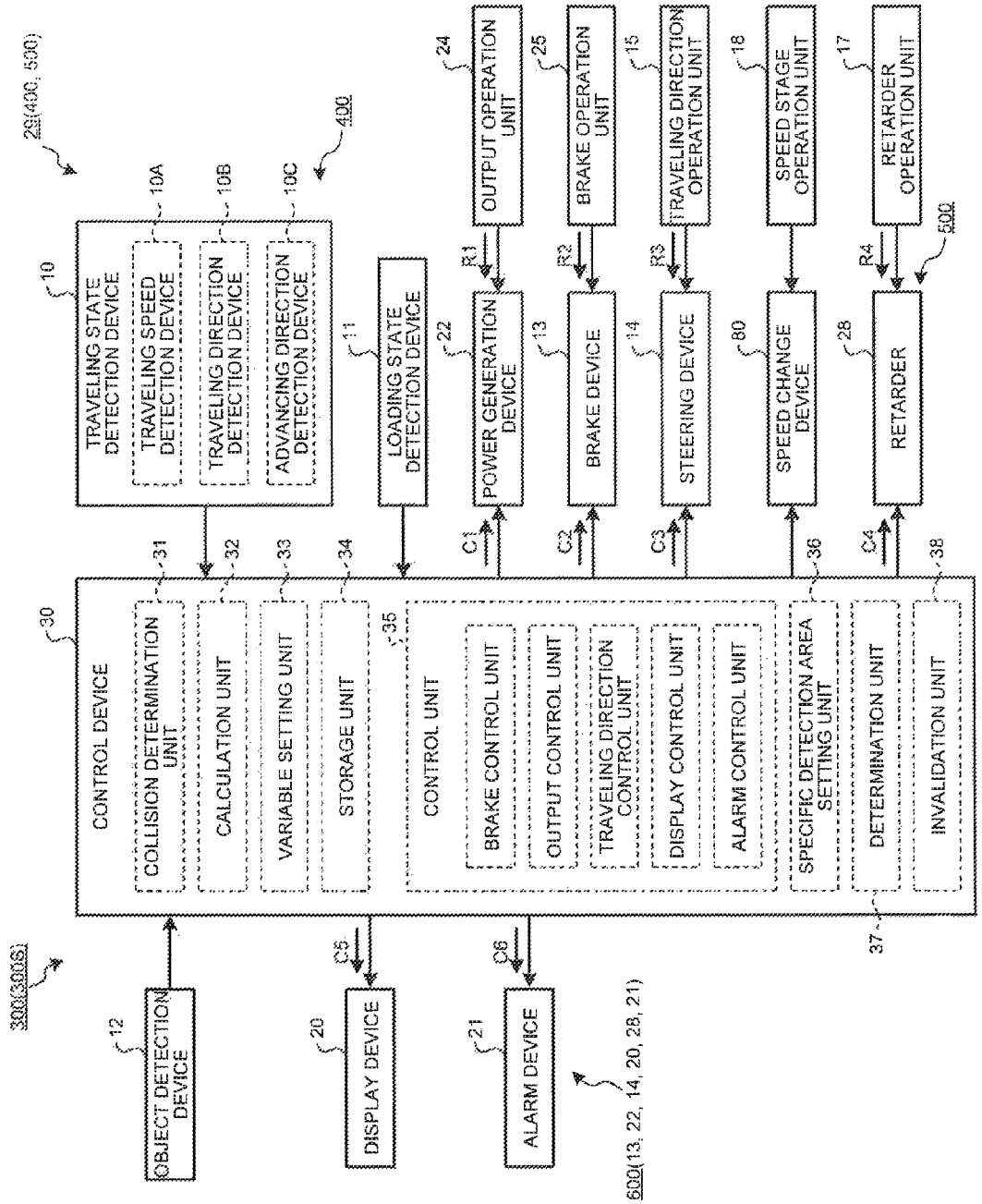
FIG. 7 is a functional block diagram illustrating an example of a control system.

Next, an example of a control system 300 of the dump truck 1 according to the embodiment will be described. FIG. 7 is a functional block diagram illustrating an example of the control system 300 according to the embodiment. The control system 300 includes the collision damage reduction system 300S.

As illustrated in FIG. 7, the control system 300 includes the control device 30 which controls the dump truck 1 and a vehicle control device 29 which is connected to the control device 30. The vehicle control device 29 includes a state quantity detection system 400 which detects the state quantity of the dump truck 1 and a traveling condition adjustment system 500 which adjusts the traveling condition of the dump truck 1. The state quantity detection system 400 includes, for example, the traveling state detection device 10 and the loading state detection device 11. The traveling condition adjustment system 500 includes, for example, the power generation device 22, the brake device 13, the traveling device 4 (the steering device 14), and a retarder 28. The object detection device 12, the display device 20, and the alarm device 21 are connected to the control device 30.

The output operation unit 24 is connected to the power generation device 22. The brake operation unit 25 is connected to the brake device 13. The traveling direction operation unit 15 is connected to the steering device 14. The speed stage operation unit 18 is connected to the speed change device 80. The retarder operation unit 17 is connected to the retarder 28.

Each of the brake device 13 and the retarder 28 is a brake device that may perform a brake process on the traveling device 4 of the vehicle 2. The brake device decelerates or stops the dump truck 1 by performing the brake process. In the embodiment, the brake device 13 and the retarder 28 includes a common brake device. Even when the operator WM operates the brake operation unit 25 or the retarder operation unit 17, the common brake device is operated, and hence the dump truck 1 may be braked. When the dump truck 1 moves down along a sloping road, the retarder 28 adjusts the braking force so that the dump truck 1 travels at a constant speed. The retarder 28 serves as an auxiliary brake. When the dump truck 1 moves down along the sloping road, the brake device generates a predetermined braking force in a manner such that the operator WM operates the retarder operation unit 17 so as to operate the retarder 28. Further, the retarder 28 adjusts the braking force of the brake device based on the traveling speed of the dump truck 1 detected by the traveling speed detection device 10A. Furthermore, the retarder 28 may be a brake device different from the brake device 13. The retarder 28 may include, for example, a brake device with at least one of a hydraulic retarder and an electromagnetic retarder.

The control device 30 includes a numerical calculator such as a CPU (Central Processing Unit). The control device 30 includes a collision determination unit 31 which determines the possibility of the collision between the dump truck 1 and the object at the front side of the dump truck 1 based on the detection result of the object detection device 12, a calculation unit 32 which calculates time information used for the determination of the possibility of the collision, a variable setting unit 33 which sets a variable used for the determination of the possibility of the collision, a storage unit 34 which stores information used for the determination of the possibility of the collision, a control unit 35 which outputs a control signal C for reducing damage caused by the collision, a specific detection area setting unit 36 which sets a specific detection area SD in the detection area SL of the object detection device 12 based on the detection result of the object detection device 12, a determination unit 37 which determines whether to set the specific detection area SD, and an invalidation unit 38 which invalidates the set specific detection area SD. The collision determination unit 31 determines the possibility of the collision between the dump truck 1 and the object at the front side of the dump truck 1 by determining whether the object exists in the specific detection area SD based on the detection result of the object detection device 31. The control unit 35 outputs the control signal C for reducing damage caused by the collision to a process system to be described later based on the determination result of the collision determination unit 31.

The storage unit 34 includes at least one of RAM (Random Access Memory), ROM (Read Only Memory), flash memory, and a hard disk.

The traveling state detection device 10 detects the traveling state of the dump truck 1 and outputs the detection result to the collision determination unit 31. The loading state detection device 11 detects the loading state of the load of the vessel 3 and outputs the detection result to the collision determination unit 31. The object detection device 12 detects the object in front of the dump truck 1 and outputs the detection result to the collision determination unit 31. The collision determination unit 31 determines the possibility of the collision between the dump truck 1 and the object based on the detection result of the traveling state detection device 10, the detection result of the loading state detection device 11, and the detection result of the object detection device 12.

The dump truck 1 includes a process system 600 capable of performing a process for reducing damage caused by the collision with the object. The process system 600 includes a plurality of process devices capable of performing different processes for reducing damage caused by the collision between the dump truck 1 and the object. In the embodiment, the process device of the process system 600 includes at least one of, for example, the brake device 13, the power generation device 22, the steering device 14, the display device 20, the retarder 28, and the alarm device 21. The brake device 13, the retarder 28, the power generation device 22, the steering device 14, the display device 20, and the alarm device 21 may respectively perform different processes for reducing damage caused by the collision. The process system 600 is controlled by the control device 30.

The brake device 13 may decrease the traveling speed of the dump truck 1 or stop the traveling dump truck 1 by performing a brake process (a stop process) on the traveling device 4. Accordingly, damage caused by the collision between the dump truck 1 and the front object is reduced.

The retarder 28 may reduce the traveling speed of the dump truck 1 or stop the traveling operation of the dump truck 1 by performing a brake process (a stop process) on the traveling device 4. Accordingly, damage caused by the collision between the dump truck 1 and the front object is reduced.

The power generation device 22 may decrease the traveling speed of the dump truck 1 by performing an output reduction process for reducing the output (the driving force) with respect to the traveling device 4. Accordingly, damage caused by the collision between the dump truck 1 and the front object is reduced.

The steering device 14 changes the traveling direction of the dump truck 1 so that an object does not exist on the traveling road of the dump truck 1 by performing the traveling direction change process of the dump truck 1 in response to a control signal C3 from the control unit (the traveling direction control unit) 35 or an operation signal R3 from the traveling direction operation unit 15. Accordingly, damage caused by the collision between the dump truck 1 and the front object is reduced.

The display device 20 may perform, for example, a display process for refreshing the attention of the operator WM. The display device 20 may generate an alarm for the operator WM by displaying an alarm image. The alarm image may be, for example, an alarm mark or a message for notifying the possibility of the collision with the object existing at the front side. Accordingly, an operation for reducing damage caused by the collision with the operator WM, for example, an operation of at least one of the output operation unit 24, the brake operation unit 25, the retarder operation unit 17, and the traveling direction operation unit 15 is performed, and hence damage caused by the collision between the dump truck 1 and the front object is reduced.

The alarm device 21 may perform an alarm generation process for refreshing the attention of the operator WM. The alarm device 21 may generate an alarm for the operator WM by making a sound or light for notifying the possibility of the collision with the object existing at the front side by using, for example, a speaker or a lamp. The alarm device 21 may include a vibration generation device capable of generating an alarm for the operator WM by vibrating at least one of the traveling direction operation unit 15 and the driver seat 16. The alarm device 21 may include a seat belt adjustment device capable of generating an alarm for the operator WM by changing the binding force of the seat belt used to protect the operator WM sitting on the driver seat 16. Accordingly, an operation for reducing damage caused by the collision is performed by the operator WM, and hence damage caused by the collision between the dump truck 1 and the front object is reduced.

The control unit 35 outputs the control signal C for reducing damage caused by the collision to the process system 600 (at least one of the brake device 13, the power generation device 22, the steering device 14, the display device 20, the retarder 28, and the alarm device 21) based on the determination result of the collision determination unit 31. The process system 600 to which the control signal C is supplied from the control unit 35 performs a process for reducing damage caused by the collision between the dump truck 1 and the object.

When it is determined that there is a high possibility that the dump truck 1 and the object may collide with each other, the control unit (the output control unit) 35 may output the control signal C1 to the power generation device 22 so that the output reduction process is performed. The power generation device 22 reduces the output based on the control signal C1 supplied from the control unit 35 and reduces the driving force with respect to the traveling device 4. Accordingly, the traveling speed of the dump truck 1 is decreased, and hence damage caused by the collision between the dump truck 1 and the object is reduced.

When it is determined that there is a high possibility of the collision between the dump truck 1 and the object, the control unit (the brake control unit) 35 outputs a control signal C4 to the retarder 28 so that a brake process is performed. The retarder 28 is operated based on the control signal C4 supplied from the control unit 35. Here, when it is determined that there is a high possibility of the collision between the dump truck 1 and the object, the control unit (the brake control unit) 35 may output a control signal C2 to the brake device 13. Accordingly, the traveling speed of the dump truck 1 is decreased or the traveling dump truck 1 is stopped, and hence damage caused by the collision between the dump truck 1 and the object is reduced.

When it is determined that there is a high possibility that the dump truck 1 and the object may collide with each other, the control unit (the traveling direction control unit) 35 may output the control signal C3 to the steering device 14 so that the traveling direction change process is performed. The steering device 14 is operated based on the control signal C3 supplied from the control unit 35. Accordingly, the traveling direction of the dump truck 1 is changed so that an object does not disposed in the traveling road of the dump truck 1, and hence damage caused by the collision between the dump truck 1 and the object is reduced.

When it is determined that there is a high possibility that the dump truck 1 and the object may collide with each other, the control unit (the alarm control unit) 35 may output a control signal C6 to the alarm device 21 so that the alarm generation process is performed. As described above, the alarm device 21 is operated based on the control signal C6 supplied from the control unit 35. The alarm device 21 generates a sound or light for refreshing the attention of the operator WM. Accordingly, any operation for reducing damage caused by the collision with the operator WM is performed, and the operation signals R (R1, R2, R3, and R4) caused by the operation are supplied to the process system 600. Accordingly, damage caused by the collision between the dump truck 1 and the object is reduced.

When it is determined that there is a high possibility that the dump truck 1 and the object may collide with each other, the control unit (the display control unit) 35 may output a control signal C5 to the display device 20 so that the display process is performed as described above. The display device 20 is operated based on the control signal C5 supplied from the control unit 35. The display device 20 displays an image for refreshing the attention of the operator WM. Accordingly, any operation for reducing damage caused by the collision with the operator WM is performed, and the operation signals R (R1, R2, R3, and R4) caused by the operation are supplied to the process system 600. Accordingly, damage caused by the collision between the dump truck 1 and the object is reduced.

The operation for reducing damage caused by the collision performed by the operator WM includes at least one of the operation of the output operation unit 24 for reducing the output of the power generation device 22, the operation of the brake operation unit 25 for operating the brake device 13, the operation of the retarder operation unit 17 for operating the retarder 28, and the operation of the traveling direction operation unit 15 for changing the traveling direction of the dump truck 1 by the steering device 14. When the output operation unit 24 is operated, the operation signal R1 is generated. The output of the power generation device 22 is reduced based on the operation signal R1 generated by the output operation unit 24. When the brake operation unit 25 is operated, the operation signal R2 is generated. The brake device 13 is operated based on the operation signal R2 generated by the brake operation unit 25, and hence the dump truck 1 is decelerated. When the traveling direction operation unit 15 is operated, the operation signal R3 is generated. The steering device 14 is operated based on the operation signal R3 generated by the traveling direction operation unit 15. When the retarder operation unit 17 is operated, the operation signal R4 is generated. The retarder 28 is operated based on the operation signal R4 generated by the retarder operation unit 17, and hence the dump truck 1 is decelerated.

The power generation device 22 is connected to each of the output control unit 35 and the output operation unit 24. The output operation unit 24 generates the operation signal R1 in response to the operation amount of the operator WM, and supplies the operation signal to the power generation device 22. The power generation device 22 generates an output based on the operation signal R1. The output control unit 35 generates the control signal C1 for controlling the power generation device 22, and supplies the control signal to the power generation device 22. The power generation device 22 generates an output based on the control signal C1.

The retarder 28 is connected to each of the retarder operation unit 17 and the brake control unit 35. The retarder operation unit 17 generates the operation signal R4 in response to the operation of the operator WM, and supplies the operation signal to the retarder 28. The retarder 28 generates a braking force based on the operation signal R4. The brake control unit 35 generates a control signal C4 for controlling the retarder 28, and supplies the control signal to the retarder 28. The retarder 28 generates a braking force based on the control signal C4.

The brake device 13 is connected to each of the brake operation unit 25 and the brake control unit 35. The brake operation unit 25 generates the operation signal R2 in response to the operation amount of the operator WM, and supplies the operation signal to the brake device 13. The brake device 13 generates a braking force based on the operation signal R2. The brake control unit 35 generates the control signal C4 or the control signal C2 for controlling the retarder 28 or the brake device 13, and supplies the control signal to the retarder 28 or the brake device 13. The retarder 28 generates a braking force based on the control signal C4. The brake device 13 generates a braking force based on the control signal C2. In the description below, a case will be described in which the brake control unit 35 generates only the control signal C4 with respect to the retarder 28 when it is determined that there is a high possibility that the dump truck 1 and the object may collide with each other due to the existence of the object in front of the dump truck 1.

The steering device 14 is connected to each of the traveling direction operation unit 15 and the traveling direction control unit 35. The traveling direction operation unit 15 generates the operation signal R3 in response to the operation amount of the operator WM, and supplies the operation signal to the steering device 14. The steering device 14 changes the direction of the front wheel 6F so that the traveling direction of the traveling device 4 is changed based on the operation signal R3. The traveling direction control unit 35 generates the control signal C3 for controlling the steering device 14, and supplies the control signal to the steering device 14. The steering device 14 changes the direction of the front wheel 6F so that the traveling direction of the traveling device 4 is changed based on the control signal C3.

The specific detection area setting unit 36 sets a specific detection area SD as an area smaller than the detection area SL at the inside of the detection area SL of the object detection device 12 based on the detection result of the object detection device 12. The specific detection area SD has a width of a first dimension in the vehicle width direction of the vehicle 2 and a length of a second dimension in the traveling direction of the vehicle 2.

The determination unit 37 determines whether to set the specific detection area SD. The invalidation unit 38 invalidates (cancels) the set specific detection area SD. The reason why the specific detection area SD is invalidated by the invalidation unit 38 is because the excessive operation of the process system 600 needs to be prevented when a predetermined condition of detecting the operation of the operation device is satisfied, for example, the handle operation unit or the like is operated by the driver WM. That is, the invalidation includes a case where the set specific detection area SD is deleted and a case where the control device 30 of the process system 600 does not output the control signal C. Furthermore, for example, if a predetermined condition is satisfied in which the operation amount of the handle operation unit is small when the handle operation unit is operated by the driver WM, the invalidation unit 38 may not invalidate the specific detection area SD. Further, if a predetermined condition is satisfied in which the operation amount is large, the invalidation unit 38 may invalidate the specific detection area SD. That is, the specific detection area SD may be invalidated if a predetermined condition is satisfied when the operation device is operated.

(Dump Truck Control Method)

Next, an example of a method of controlling the dump truck 1 will be described. In the embodiment, an example of a control method of reducing damage caused by the collision between the dump truck 1 and the object existing at the front side of the dump truck 1 will be mainly described. In the description below, the object is assumed as the other dump truck 1F existing in front of the dump truck 1. In the embodiment, an example of a control method of reducing damage caused by the crash between the dump truck 1 and the dump truck 1F in front of the dump truck 1 will be mainly described. In the description below, the dump truck 1F in front of the dump truck 1 is appropriately referred to as the front dump truck 1F.

Figure 8:
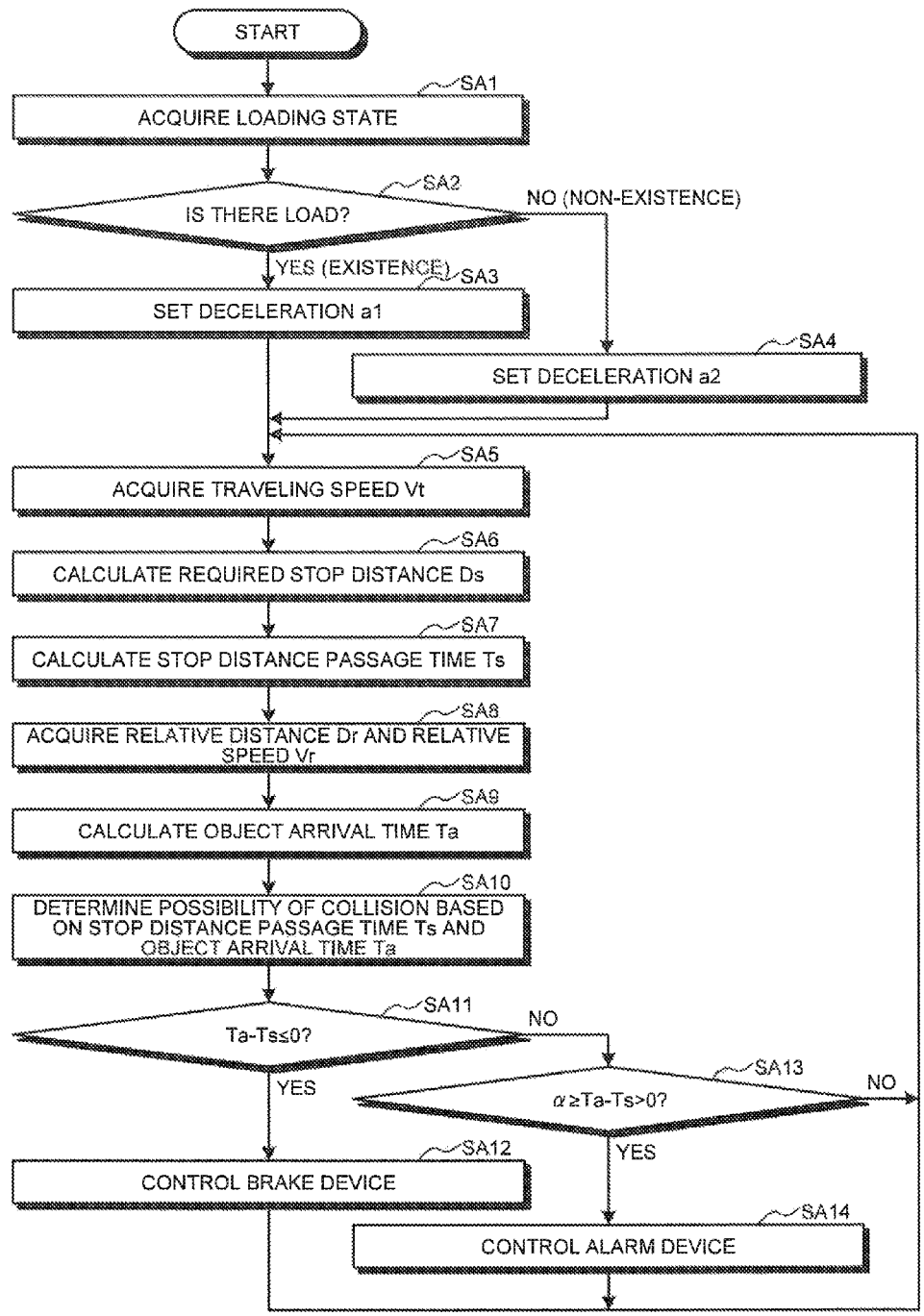
FIG. 8 is a flowchart illustrating an example of a transporter vehicle control method.

FIG. 8 is a flowchart illustrating an example of a method of controlling the dump truck 1 according to the embodiment. The loading state detection device 11 detects the loading state of the load of the vessel 3. The detection result of the loading state detection device 11 is output to the control device 30. The control device 30 acquires the detection result of the loading state detection device 11 (step SA1).

Figure 9:
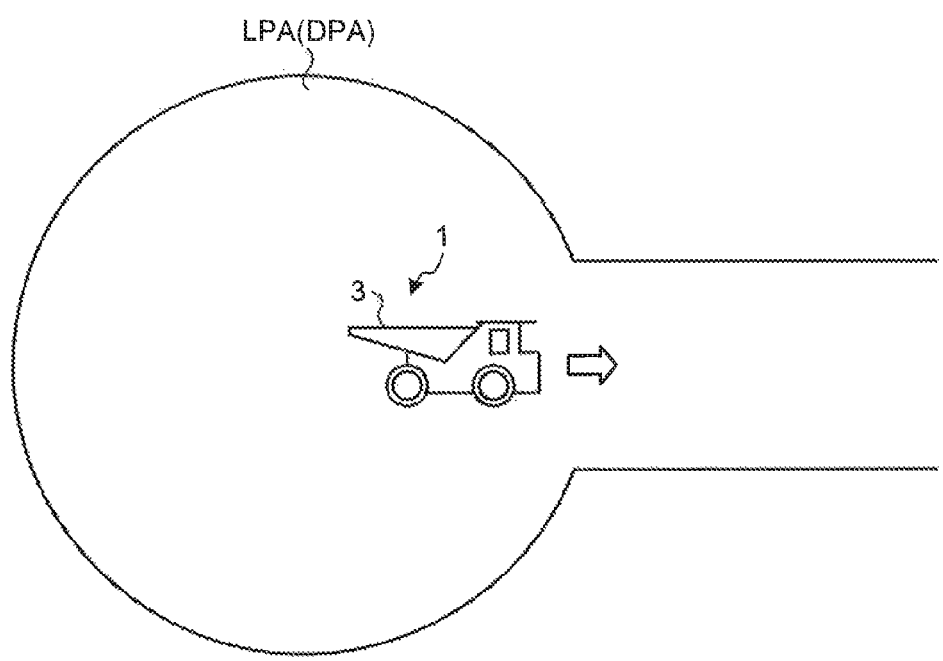
FIG. 9 is a schematic diagram illustrating an example of the operation of the transporter vehicle.

The timing at which the control device 30 acquires the detection result of the loading state detection device 11 may be a timing at which the dump truck 1 starts to move from the loading field LPA or a timing at which the dump truck 1 starts to move from the soil disposal field DPA. That is, as illustrated in FIG. 9, when a load is loaded on the vessel 3 in the loading field LPA of the mine and the dump truck 1 in a loaded state starts to move from the loading field LPA, the control device 30 may acquire the detection result of the loading state detection device 11. When a load is discharged from the vessel 3 in the soil disposal field DPA of the mine and the dump truck 1 in an empty state starts to move from the soil disposal field DPA, the control device 30 may acquire the detection result of the loading state detection device 11.

Figure 10:
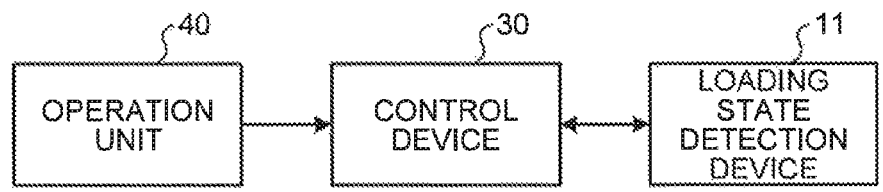
FIG. 10 is a diagram illustrating an example of the control system.

As illustrated in FIG. 10, the timing at which the control device 30 acquires the detection result of the loading state detection device 11 may be determined by the operation of an operation unit 40. The operation unit 40 is disposed near the driver seat 16 inside the cab 8. The operator WM operates the operation unit 40 when the dump truck 1 starts to move from the loading field LPA or the dump truck 1 starts to move from the soil disposal field DPA. When the operation unit 40 is operated, the detection result of the loading state detection device 11 is output to the control device 30. The control device 30 may acquire the detection result of the loading state detection device 11 at the timing at which the operation unit 40 is operated.

For example, a timer (not illustrated) provided in the control device 30 detects whether a predetermined time elapses from the timing at which the dump truck 1 starts to move from the loading field LPA or the soil disposal field DPA based on the trigger enabled when the loading state detection device 11 detects the loaded state or the empty state. After the timer measures a state where a predetermined time elapses, the detection result of the loading state detection device 11 may be acquired by the control device 30.

An average value of a plurality of detection values of the loading state detection device 11 detected until a predetermined time elapses from the timing at which the dump truck 1 starts to move from the loading field LPA or the soil disposal field DPA may be acquired by the control device 30 as the detection result in the loaded state.

In the embodiment, the loading state of the load of the vessel 3 includes the state where a load exists in the vessel 3. The control device 30 determines whether a load exists in the vessel 3 (step SA2). The storage unit 34 stores a threshold value for the weight of the load. The control device 30 compares the threshold value with the detection value of the loading state detection device 11. When it is determined that the detection value of the loading state detection device 11 is larger than the threshold value, the control device 30 determines that a load exists in the vessel 3. When it is determined that the detection value of the loading state detection device 11 is equal to or smaller than the threshold value, the control device 30 determines that no load exists in the vessel 3.

Next, the deceleration a of the dump truck 1 (the vehicle 2) is set based on the loading state of the load of the vessel 3 by the variable setting unit 33. The deceleration a of the dump truck 1 is the deceleration (the negative acceleration) of the dump truck 1 when the retarder 28 is operated. In the embodiment, the deceleration a of the dump truck 1 indicates the deceleration of the dump truck 1 when a brake device is operated so that the maximum braking capability of the brake device including the retarder 28 is exhibited. Furthermore, the deceleration a of the dump truck 1 may be a deceleration capable of exhibiting the braking capability in the range where the slip of the dump truck 1 may be suppressed. In general, when the weight of the dump truck 1 is large, the deceleration a is small. When the weight of the dump truck 1 is small, the deceleration a is large. When the deceleration a is small, the traveling dump truck 1 may not easily stop. When the deceleration a is large, the traveling dump truck 1 may easily stop. In the description below, the state where the retarder 28 is operated so that the maximum braking capability of the retarder 28 is exhibited is appropriately referred to as a full brake state.

The weight of the dump truck 1 changes based on the weight of the load loaded on the vessel 3. Accordingly, when the vessel 3 is in an empty state, the weight of the dump truck 1 decreases, and the deceleration a of the dump truck 1 increases (the dump truck 1 may easily stop). When the vessel 3 is in a loaded state, the weight of the dump truck 1 increases, and the deceleration a of the dump truck 1 decreases (the dump truck 1 may not easily stop).

The information on the relation between the weight of the dump truck 1 and the deceleration a of the dump truck 1 of the weight may be obtained in advance by an experiment or a simulation. The storage unit 34 stores the information on the relation between the weight of the load and the deceleration a of the dump truck 1 obtained by an experiment or a simulation.

In the embodiment, the storage unit 34 stores the deceleration a1 of the dump truck 1 in the loaded state and the deceleration a2 of the dump truck 1 in the empty state. The deceleration a2 is larger than the deceleration a1.

When a load is loaded on the vessel 3 in the mining site of the mine, a load may be loaded on the vessel 3 so that the maximum loading capability of the vessel 3 is exhibited from the viewpoint of the improvement in productivity of the mining site. That is, a load of the amount corresponding to 100% of the capacity volume of the vessel 3 is loaded on the vessel 3. For example, the operation in which a load of the amount corresponding to 70% of the capacity volume of the vessel 3 is loaded on the vessel 3 has poor production efficiency and is unusual. That is, in the embodiment, the loaded state of the vessel 3 indicates a state where a load is fully loaded on the vessel 3. For that reason, the deceleration a of the dump truck 1 is sufficient as two values, that is, a deceleration a1 corresponding to the dump truck 1 in the loaded state (the full state) and a deceleration a2 corresponding to the dump truck 1 in the empty state.

In step SA2, when it is determined that a load exists, the variable setting unit 33 sets the deceleration a1 (step SA3). In step SA2, when it is determined that a load does not exist, the variable setting unit 33 sets the deceleration a2 (step SA4).

The traveling state detection device 10 detects the traveling state of the dump truck 1. The detection result of the traveling state detection device 10 is output to the control device 30. The control device 30 acquires the detection result of the traveling state detection device 10.

The traveling speed detection device 10A of the traveling state detection device 10 detects the traveling speed Vt of the dump truck 1, and outputs the detection result to the control device 30. The control device 30 acquires the detection result of the traveling speed detection device 10A (step SA5).

The detection result of the traveling direction detection device 10B and the detection result of the advancing direction detection device 10C are also output to the control device 30. The control device 30 acquires the detection result of the traveling direction detection device 10B and the detection result of the advancing direction detection device 10C.

The detection cycle of the traveling state detection device 10 is Gt (for example, a cycle equal to or longer than 1 ms and equal to or shorter than 100 ms). The traveling state detection device 10 continuously outputs the detection result to the control device 30 at a predetermined time interval (the detection cycle) Gt. The control device 30 acquires the detection result. The control device 30 normally monitors the detection result of the traveling state detection device 10 during the operation of the dump truck 1.

The time information used in the determination of the possibility of the collision with the object is calculated based on the detection result of the traveling state detection device 10 by the calculation unit 32. The calculation unit 32 calculates the required stop distance Ds (step SA6). Further, the calculation unit 32 calculates the stop distance passage time Ts based on the traveling speed Vt and the required stop distance Ds (step SA7).

Figure 11:
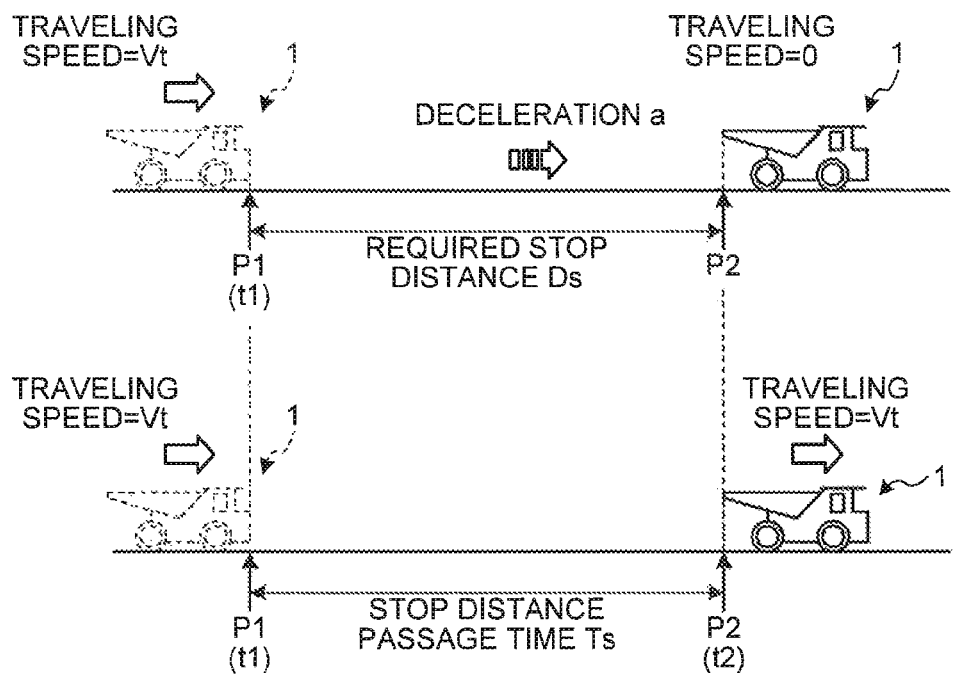
FIG. 11 is a schematic diagram illustrating an example of the operation of the transporter vehicle.

FIG. 11 is a view illustrating the required stop distance Ds and the stop distance passage time Ts. The required stop distance Ds will be described. As illustrated in FIG. 11, in the case where the traveling speed of the dump truck 1 at a first point P1 detected by the traveling state detection device 10 is Vt and the deceleration set by the variable setting unit 33 is a, the dump truck 1 stops at a second point P2 in front of the first point P1 when the retarder 28 is operated in a full brake state when the dump truck 1 is located at the first point P1. At the second point P2, the traveling speed is, of course, 0. The required stop distance Ds is a distance between the first point P1 where the retarder 28 is operated in the full brake state and the second point P2 where the dump truck 1 stops. When the traveling speed of the dump truck 1 at the first point P1 detected by the traveling state detection device 10 is Vt and the deceleration set by the variable setting unit 33 is a, the required stop distance Ds is obtained based on the following equation (1).

$$Ds = Vt(Vt/a) - (1/2)a(Vt/a)^2 = (1/2a)Vt^2 \quad (1)$$

Accordingly, when the deceleration a1 is set, the following equation is obtained.

$$Ds = (1/2a1)Vt^2 \quad (1A)$$

When the deceleration a2 is set, the following equation is obtained.

$$Ds = (1/2a2)Vt^2 \quad (1B)$$

In this way, in the embodiment, the required stop distance Ds between the first point P1 and the second point P2 where the dump truck 1 is stopped is calculated based on the set deceleration a calculated by the variable setting unit 33 and the traveling speed Vt of the dump truck 1 (the vehicle 2) at the first point P1 detected by the traveling state detection device 10.

Next, the stop distance passage time Ts will be described. The stop distance passage time Ts indicates the time from the first time point t1 at which the dump truck 1 exists at the first point P1 to the second time point t2 at which the dump truck reaches the second point P2 when the dump truck travels by the required stop distance Ds at the traveling speed Vt. That is, the stop distance passage time Ts indicates the time necessary for the dump truck 1 to travel by the required stop distance Ds when the dump truck travels by the required stop distance Ds at the constant traveling speed Vt without the operation of the brake device 13 in the state where the dump truck travels at the traveling speed Vt in the first point P1 (the first time point t1). The stop distance passage time Ts is obtained based on the following equation (2).

$$Ts = Ds/Vt \quad (2)$$

With the above-described configuration, the required stop distance Ds and the stop distance passage time Ts are respectively calculated.

The object detection device 12 detects, for example, the front dump truck 1F. The detection result of the object detection device 12 is output to the control device 30. The control device 30 acquires the detection result of the object detection device 12.

The object detection device 12 includes a radar device, and may detect the front dump truck 1F. The object detection device 12 may detect the relative distance Dr and the relative speed Vr of the front dump truck 1F and the dump truck 1 provided with the object detection device 12. The object detection device 12 detects the relative distance Dr and the relative speed Vr with respect to the front dump truck 1F, and outputs the detection result to the control device 30. The control device 30 acquires the relative distance Dr and the relative speed Vr with respect to the front dump truck 1F (step SA8).

The detection cycle of the object detection device 12 is different from the detection cycle Gt of the traveling state detection device 10. The object detection device 12 continuously outputs the detection result to the control device 30 at a predetermined time interval. The control device 30 acquires the detection result. The control device 30 monitors the detection result of the object detection device 12 at all times during the operation of the dump truck 1.

The calculation unit 32 calculates the time information used in the determination of the possibility of the collision based on the detection result of the object detection device 12. The calculation unit 32 calculates the object arrival time Ta until the dump truck 1 arrives at the front dump truck 1F (step SA9).

Figure 12:
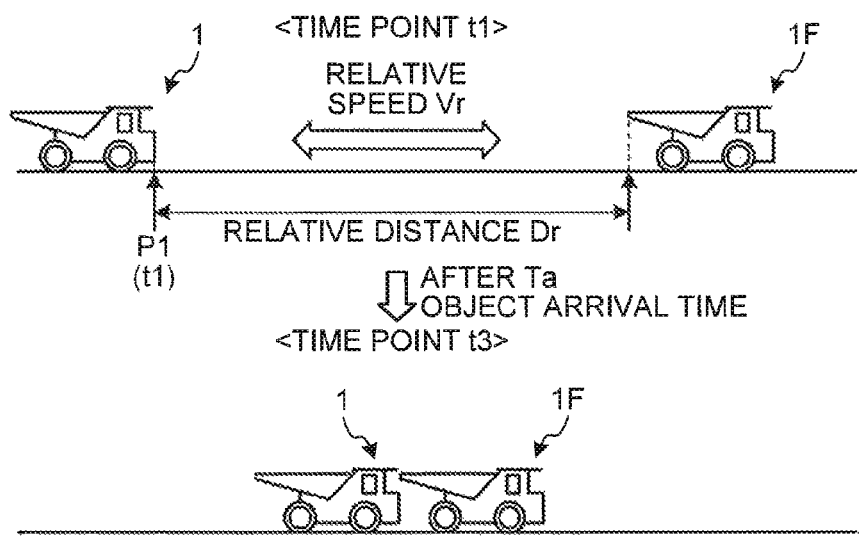
FIG. 12 is a schematic diagram illustrating an example of the operation of the transporter vehicle.

FIG. 12 is a view illustrating the object arrival time Ta. The object arrival time Ta indicates the time taken to the third time point t3 at which the dump truck 1 arrives at the front dump truck 1F when the dump truck travels by the relative distance Dr at the relative speed Vr from the first time point t1 based on the relative distance Dr and the relative speed Vr of the dump truck 1 and the front dump truck 1F at the first point P1 (the first time point t1) detected by the object detection device 12 of the dump truck 1 when the dump truck 1 exists at the first point P1. That is, when the time point at which the relative distance Dr and the relative speed Vr are detected is set as the first time point t1 and the time point at which the dump truck 1 arrives at the front dump truck 1F when the dump truck travels by the relative distance Dr detected at the first time point t1 at the relative speed Vr is set as the third time point t3, the object arrival time Ta indicates the time from the first time point t1 to the third time point t3. The object arrival time Ta is obtained by the following equation (3).

$$Ta = Dr/Vr \quad (3)$$

In this way, the object arrival time Ta taken until the third time point t3 at which the dump truck 1 arrives at the front dump truck 1F when the dump truck travels by the relative distance Dr at the relative speed Vr from the first time point t1 is calculated based on the relative distance Dr and the relative speed Vr of the dump truck 1 and the front dump truck 1F at the first time point t1 detected by the object detection device 12.

The control device 30 continuously calculates the stop distance passage time Ts and the object arrival time Ta at each of a plurality of points (each of time points) by monitoring the detection value of the traveling state detection device 10 and the detection value of the object detection device 12 at all times. In other words, the control device 30 outputs the stop distance passage time Ts and the object arrival time Ta at each of a plurality of points (each of time points) at a predetermined time interval Gt.

The collision determination unit 31 determines the possibility of the collision between the dump truck 1 and the front dump truck 1F based on the stop distance passage time Ts and the object arrival time Ta (step SA10).

The collision determination unit 31 compares the stop distance passage time Ts with the object arrival time Ta and determines the possibility of the collision based on the comparison result. In the embodiment, the collision determination unit 31 performs the calculation of "Ta−Ts". Based on the result of the calculation of "Ta−Ts", it is estimated whether the dump truck 1 and the front dump truck 1F collide with each other from the first time point t1. The calculation of "Ta−Ts" is performed at a predetermined time interval Gt.

When the calculation result satisfies the relation of "Ta−Ts≤0" (Yes in step SA11), the time taken for the collision between the dump truck 1 and the front dump truck 1F, that is, the object arrival time Ta is estimated as the time equal to the stop distance passage time Ts or the time shorter than the stop distance passage time Ts. In this case, the collision determination unit 31 determines that the possibility of the collision is Level 1 in which the possibility of the collision between the dump truck 1 and the front dump truck 1F is the highest.

When the calculation result satisfies the relation of "α≥Ta−Ts>0" (Yes in step SA13), the time taken for the collision between the dump truck 1 and the front dump truck 1F, that is, the object arrival time Ta is the time slightly longer than the stop distance passage time Ts. In this case, the collision determination unit 31 determines that the possibility of the collision is Level 2 in which the possibility of the collision between the dump truck 1 and the front dump truck 1F is lower than that of Level 1. The numerical value α is a positive value which is set in advance.

When the calculation result satisfies the relation of "Ta−Ts>α" (No in step SA13), the time taken for the collision between the dump truck 1 and the front dump truck 1F, that is, the object arrival time Ta is the time sufficiently longer than the stop distance passage time Ts. In this case, the collision determination unit 31 determines that the possibility of the collision is Level 3 in which the possibility of the collision between the dump truck 1 and the front dump truck 1F is the lowest.

In this way, it is estimated whether the dump truck 1 and the front dump truck 1F collide with each other based on the result of the calculation "Ta−Ts", and the possibility of the collision is determined based on the estimation result. Further, the possibility of the collision (the risk) is classified into a plurality of levels based on the estimation result. In the embodiment, the possibility of the collision is classified into Level 1, Level 2, and Level 3. Among Level 1, Level 2, and Level 3, Level 1 is the level in which the possibility of the collision is the highest, Level 2 is the level in which the possibility of the collision is lower than that of Level 1, and Level 3 is the level in which the possibility of the collision is the lowest.

The collision determination unit 31 determines whether the result of the calculation "Ta−Ts" is Level 1 (Ta−Ts≤0) (step SA11).

In step SA11, when it is determined that the result is Level 1 (Yes in step SA11), the control device 30 controls the retarder 28 (step SA12). The control unit 35 outputs the control signal C4 to the retarder 28. The control unit 35 outputs the control signal C4 to the retarder 28 so that the retarder 28 is operated in the full brake state.

The brake process of the retarder 28 is performed based on the control signal C4 supplied from the control unit 35. Accordingly, the traveling speed of the dump truck 1 is decreased or the dump truck 1 is stopped. Thus, damaged caused by the collision between the dump truck 1 and the front dump truck 1F is reduced.

At Level 1, the control signal C4 takes priority over the operation signal R2 and the operation signal R1. When the control signal C4 is output from the control unit 35 to the retarder 28, the brake process of the retarder 28 is performed based on the control signal C4 regardless of the state where the brake operation unit 25 is operated, the state where the operation amount of the brake operation unit 25 is large or small, the state where the output operation unit 24 is operated, and the state where the operation amount of the output operation unit 24 is large or small. Furthermore, at Level 1, the control signal C4 may take over the operation signal R4.

In step SA11, when it is determined that the result is Level 1, the control unit 35 may output the control signal C1 to the power generation device 22 so that the output of the power generation device 22 is reduced. The output reduction process of the power generation device 22 is performed based on the control signal C1 supplied from the control unit 35. Accordingly, the traveling speed of the dump truck 1 is decreased. Thus, damaged caused by the collision between the dump truck 1 and the front dump truck 1F is reduced.

In this case, at Level 1, the control signal C1 takes over the operation signal R1 and the operation signal R2. When the control signal C1 is output from the control unit 35 to the power generation device 22, the output reduction process of the power generation device 22 is performed based on the control signal C1 regardless of the state where the brake operation unit 25 is operated, the operation amount of the brake operation unit 25 is large or small, the state where the output operation unit 24 is operated, and the state where the operation amount of the output operation unit 24 is large or small. Furthermore, at Level 1, the control signal C1 may take over the operation signal R4.

In step SA11, when it is determined that the possibility of the collision is Level 1, the control unit 35 may output the control signal C4 to the retarder 28 and may output the control signal C1 to the power generation device 22. That is, the output reduction process of the power generation device 22 may be performed along with the brake process of the retarder 28.

In step SA11, when it is determined that the result of the calculation "Ta−Ts" is not Level 1 (Ta−Ts≤0) (No in step SA11), the collision determination unit 31 determines whether the result of the calculation "Ta−Ts" is Level 2 (α≥Ta−Ts>0) (step SA13).

In step SA13, when it is determined that the result is Level 2 (Yes in step SA13), the control device 30 controls the alarm device 21 (step SA14). The control unit 35 outputs the control signal C6 to the alarm device 12. The control unit 35 outputs the control signal C6 to the alarm device 21 so that the alarm device 21 generates an alarm.

Based on the control signal C6 supplied from the control unit 35, the alarm generation process of the alarm device 21 is performed. The alarm device 21 refreshes the attention of the operator WM by generating a sound or light. Thus, an operation for reducing damage caused by the collision is performed by the operator WM. Accordingly, damage caused by the collision between the dump truck 1 and the front dump truck 1F is reduced.

In step SA13, when it is determined that the result is Level 2, the control unit 35 may output the control signal C5 to the display device 20. Based on the control signal C5 supplied from the control unit 35, the display process of the display device 20 is performed. Thus, an operation for reducing damage caused by the collision is performed by the operator WM.

In step SA13, when it is determined that the result is Level 2, the control unit 35 may output the control signal C2 so that the brake device 13 is operated. For example, the brake process of the brake device 13 may be performed so that a braking force smaller than the braking force in the full brake state is generated based on the control signal C2 supplied from the control unit 35. Alternatively, in step SA13, when it is determined that the result is Level 2, the control unit 35 outputs the control signal C4 so that the retarder 28 is operated, but the brake process of the retarder 28 may be performed so that a braking force smaller than the braking force in the full brake state is generated.

In the description below, a state where the retarder 28 is operated so as to generate a braking force smaller than the braking force of the full brake state will be appropriately referred to as a weak brake state or a pre-brake state.

In step SA13, when it is determined that the result is Level 2, the control unit 35 may output the control signal C1 so that the output of the power generation device 22 is reduced. Based on the control signal C1 supplied from the control unit 35, the output reduction process of the power generation device 22 is performed.

In step SA13, when it is determined that the result of the calculation "Ta−Ts" is not Level 2 ($\alpha \geq$ Ta−Ts>0) (No in step SA13), the collision determination unit 31 determines that the result of the calculation "Ta−Ts" is Level 3 (Ta−Ts>$\alpha$).

When it is determined that the result is Level 3, a process for reducing damage caused by the collision is not performed by the process system 600. The control system 300 returns the routine to step SA5, and repeats the above-described series of processes. For example, the control device 30 continuously monitors the detection result of the traveling state detection device 10 and the detection result of the object detection device 12 at all times.

In step SA12, when the retarder 28 is controlled and that the traveling speed Vt of the dump truck 1 is decreased so that the possibility of the collision is decreased, the output of the control signal C4 from the control unit 35 to the retarder 28 is stopped. Thus, the control of the retarder 28 by the control device 30 is not performed. The control system 300 returns the routine to step SA5, and repeats the above-described series of processes.

In step SA14, when the alarm device 21 is controlled and the traveling speed Vt of the dump truck 1 is decreased by, for example, any one of the operations of the brake operation unit 25, the retarder operation unit 17, and the output operation unit 24 by the operator WM so that the possibility of the collision is decreased, the output of the control signal C6 from the control unit 35 to the alarm device 21 is stopped. Thus, the control of the alarm device 21 by the control device 30 is not performed. The control system 300 returns the routine to step SA5, and repeats the above-described series of processes.

In at least one of step SA1 and step SA13, when it is determined that the possibility of the collision is Level 1 or Level 2, the control unit 35 may output the control signal C3 to the steering device 14 in order to reduce damage caused by the collision between the dump truck 1 and the front dump truck 1F. When the front dump truck 1F exists on the traveling road of the dump truck 1, the traveling direction of the dump truck 1 may be changed by performing the traveling direction change process of the steering device 14 so that the front dump truck 1F is not disposed on the traveling road of the dump truck 1.

At Level 1, the control signal C3 may take priority over the operation signal R3. When the control signal C3 is output from the control unit 35 to the steering device 14, the steering device 14 performs the traveling direction change process based on the control signal C3 regardless of the state where the traveling direction operation unit 15 is operated and the state where the operation amount of the traveling direction operation unit 15 is large or small.

In the embodiment, in step SA5, not only the detection result of the traveling speed detection device 10A, but also the detection result of the traveling direction detection device 10B and the detection result of the advancing direction detection device 10C are also output to the control device 30. For example, when it is determined that the traveling direction of the dump truck 1 changes so that the front dump truck 1F is deviated from the traveling road of the dump truck 1 based on the detection result of the traveling direction detection device 10B even when the object detection device 12 detects the front dump truck 1F, the control device 30 may determine that the possibility of the collision is low (Level 3). In that case, a process for reducing damage caused by the collision may not be performed by the process system 600.

When the dump truck 1 moves backward, there is a low possibility that the dump truck 1 and the front dump truck 1F may collide with each other. For that reason, when it is determined that the dump truck 1 moves backward based on the detection result of the advancing direction detection device 10C, a process for reducing damage caused by the collision may not be performed by the process system 600.

In the embodiment, when it is determined that the possibility of the collision is Level 2, the operation signal R1 may take priority over the control signal C1. For example, when both the operation signal R1 and the control signal C1 are supplied to the power generation device 22, the power generation device 22 may be driven based on the operation signal R1. Further, when it is determined that the possibility of the collision is Level 2, the operation signal R2 may take priority over the control signal C2. For example, when both the operation signal R2 and the control signal C2 are supplied to the brake device 13, the brake device 13 may be driven based on the operation signal R2. Further, when it is determined that the possibility of the collision is Level 2, the operation signal R3 may take priority over the control signal C3. For example, when both the operation signal R3 and the control signal C3 are supplied to the steering device 14, the steering device 14 may be driven based on the operation signal R3. That is, when the possibility of the collision is Level 2 or Level 3, the operation of the driver WM may take priority.

Furthermore, in the embodiment, the collision possibility level is classified into three levels (Level 1, Level 2, and Level 3). The collision possibility level may be classified into plural levels of four levels or more. The collision possibility level may be classified into two levels (Level 1 and Level 2). That is, the collision possibility level may be classified into two levels of a level without a possibility of the collision and a level with a possibility of the collision. In such a case, when a predetermined condition is satisfied in which the driver WM operates any operation device (the operation unit) to generate the operation signal R while the control signal C is output from the control device 30, the operation signal R may take priority at the level without a possibility of the collision, and the control signal C may take priority over the operation signal R at the level with a possibility of the collision. Further, for example, when the driver WM operates the handle operation unit or the like, the control signal C may take priority when a predetermined condition is satisfied in which the operation amount is small, and the operation signal R may take priority when a predetermined condition is satisfied in which the operation amount is large. That is, when the operation signal R is generated by the operation of the operation device, the control signal C may take priority when a predetermined condition is satisfied.

(Specific Detection Area)

In the embodiment, the specific detection area setting unit 36 sets the specific detection area SD having a width of a first dimension in the vehicle width direction of the dump truck 1 and a length of a second dimension in the traveling direction (the advancing direction) of the dump truck 1 in the detection area SL of the object detection device 12 based on the detection result of the object detection device 12. The collision determination unit 31 determines whether an object exists in the specific detection area SD based on the detection result of the object detection device 12, and determines the possibility of the collision based on the determination result. The control unit 35 outputs the control signal C for reducing the damage caused by collision to the process system 600 based on the determination result of the collision determination unit 31.

Figure 13:
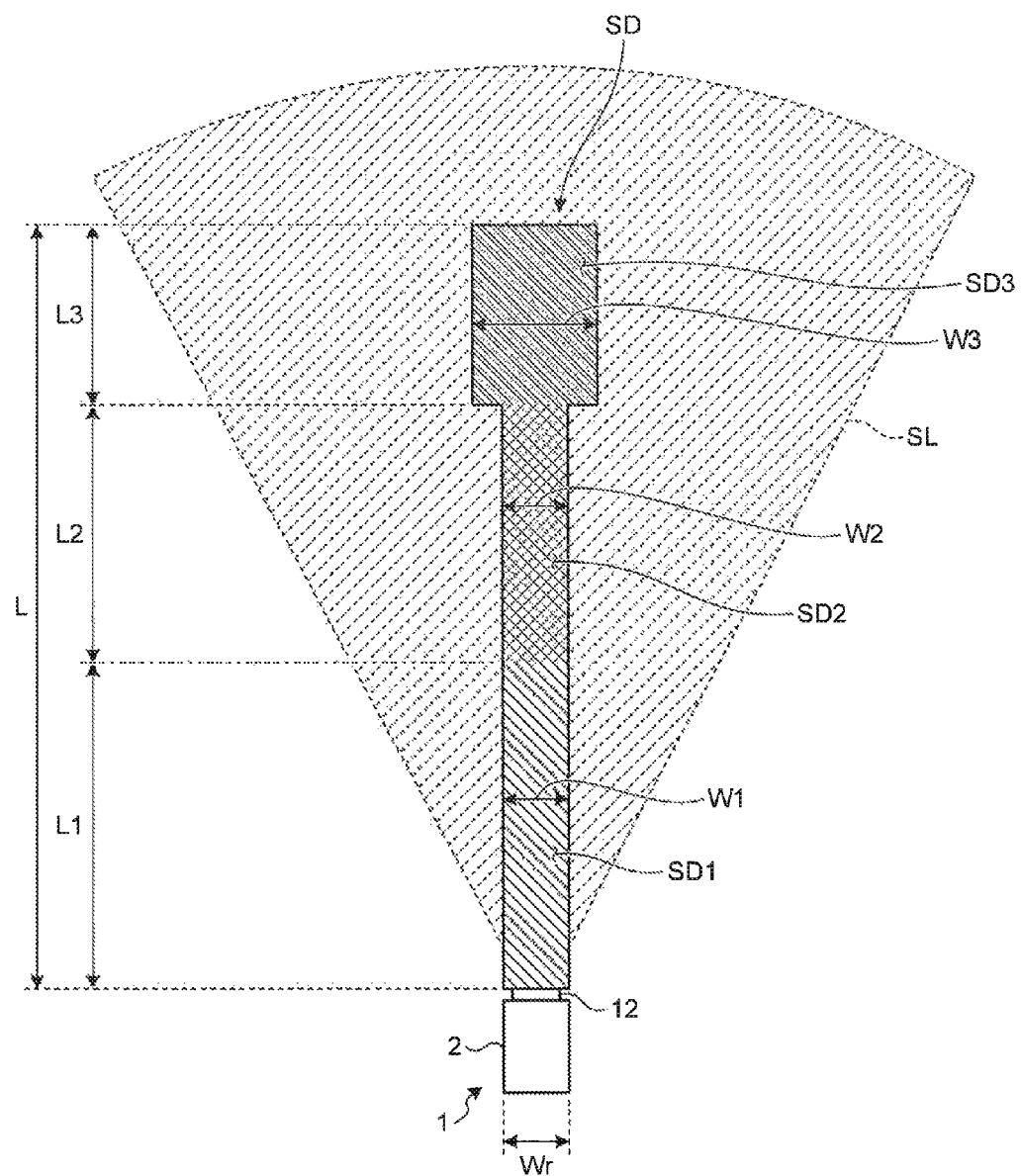
FIG. 13 is a diagram illustrating an example of a specific detection area.

FIG. 13 is a schematic diagram illustrating an example of the specific detection area SD according to the embodiment. As illustrated in FIG. 1.3, the specific detection area SD is an area smaller than the detection area SL. The outer shape of the specific detection area SD is substantially rectangular.

The specific detection area SD has a width of a dimension (a first dimension) W in the vehicle width direction of the dump truck 1. The dimension W in the width of the specific detection area SD includes the dimension Wr of the vehicle width of the vehicle 2. The specific detection area SD includes a length of a dimension (a second dimension) L in the traveling direction of the dump truck 1.

The specific detection area SD includes a first portion SD1, a second portion SD2 which is far from the vehicle 2 in relation to the first portion SD1 in the traveling direction (the advancing direction), and a third portion SD3 which is far from the vehicle 2 in relation to the second portion SD2 in the traveling direction (the advancing direction).

The first portion SD1 has a width of a dimension W1 and a length of a dimension L1. The second portion SD2 has a width of a dimension W2 and a length of a dimension L2. The third portion SD3 has a width of a dimension W3 and a length of a dimension L3. The dimension W1 of the width of the first portion SD1 is the dimension Wr of the vehicle width of the vehicle 2. The dimension W2 of the width of the second portion SD2 is the dimension Wr of the vehicle width of the vehicle 2. The dimension W3 of the width of the third portion SD3 is larger than the dimension W1 of the width of the first portion SD1 and the dimension W2 of the width of the second portion SD2.

When the driver WM operates the traveling direction operation unit 15, the third portion SD3 largely moves in the vehicle width direction in relation to the first portion SD1. For example, in the state where the dump truck 1 moves straightly, the driver WM operates the handle operation unit (the handle) while finely adjusting the handle operation unit left and right in order to maintain the straight traveling operation of the dump truck 1. That is, the traveling direction operation unit 15 is slightly operated in the straight movement state. As a result, there is a possibility that the third portion SD3 may slightly move in the vehicle width direction. When the dimension W3 of the width of the third portion SD3 is small, there is a high possibility that the object existing at the front side of the dump truck 1 may not exist inside the third portion SD3. In the embodiment, since the dimension W3 is larger than the dimension W1, the object at the front side of the dump truck 1 may exist in the third portion SD3 even when the traveling direction operation unit 15 is operated unintentionally.

For example, when the dump truck 1 travels while overtaking the object stopping at the front side thereof (for example, the stopping front dump truck), at least a part of the object may exist in the third portion SD3 of the specific detection area SD at a position separated from the dump truck 1, and hence the object may be detected. Since the object is detected, the driver WM that drives the dump truck 1 may operate the traveling operation unit 15 so that the dump truck 1 may smoothly overtake the object.

The specific detection area setting unit 36 changes the shape of the specific detection area SD based on the traveling condition of the dump truck 1 (the vehicle 2). In the embodiment, the traveling condition of the dump truck 1 includes the relative speed between the dump truck 1 and the object at the front side of the dump truck 1. The traveling condition of the dump truck 1 includes the traveling speed of the dump truck 1. The traveling condition of the dump truck 1 includes the traveling direction of the dump truck 1.

The object detection device 12 may detect the relative speed between the dump truck 1 and the object existing in the detection area SL. The specific detection area setting unit 36 changes the length of the second dimension L of the specific detection area SD based on the relative speed detected by the object detection device 12. The specific detection area setting unit 36 shortens the length of the second dimension L of the specific detection area SD when the relative speed is low (the distance between the dump truck 1 and the front object does not change or is gently shortened). The specific detection area setting unit 36 lengthens the length of the second dimension L of the specific detection area SD when the relative speed is high (the distance between the dump truck 1 and the front object is abruptly shortened).

The traveling speed detection device 10A may detect the traveling speed of the dump truck 1. The specific detection area setting unit 36 may change the length of the second dimension L of the specific detection area SD based on the traveling speed of the dump truck 1 detected by the traveling speed detection device 10A. The specific detection area setting unit 36 may shorten the length of the second dimension L of the specific detection area SD when the traveling speed of the dump truck 1 is low. The specific detection area setting unit 36 may lengthen the length of the second dimension L of the specific detection area SD when the traveling speed of the dump truck 1 is high.

Figure 14:
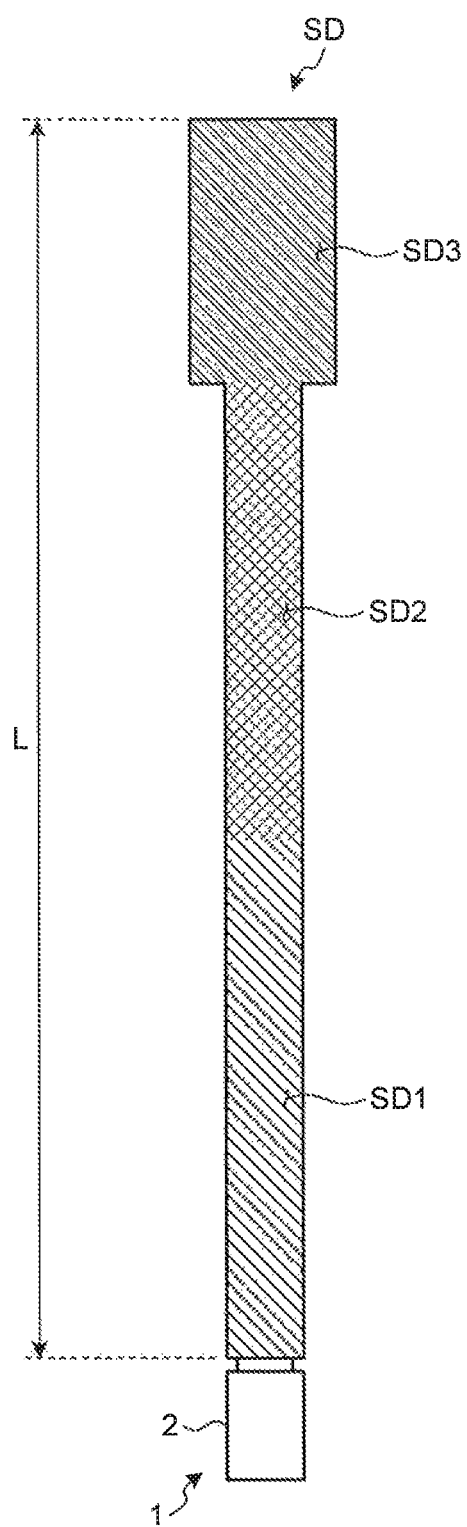
FIG. 14 is a diagram illustrating an example of the specific detection area.
Figure 15:
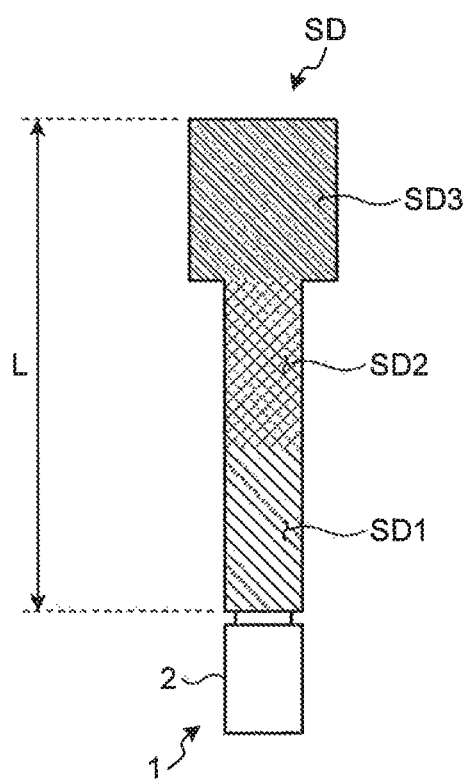
FIG. 15 is a diagram illustrating an example of the specific detection area.

FIG. 14 illustrates an example in which the relative speed between the dump truck 1 and the object or the traveling speed of the dump truck 1 increases and the length of the second dimension L of the specific detection area SD is lengthened. FIG. 15 illustrates an example in which the relative speed between the dump truck 1 and the object or the traveling speed of the dump truck 1 decreases and the length of the second dimension L of the specific detection area SD is shortened. The length of the second dimension L is involved with the relative speed between the dump truck 1 and the object or the traveling speed of the dump truck 1.

Figure 16:
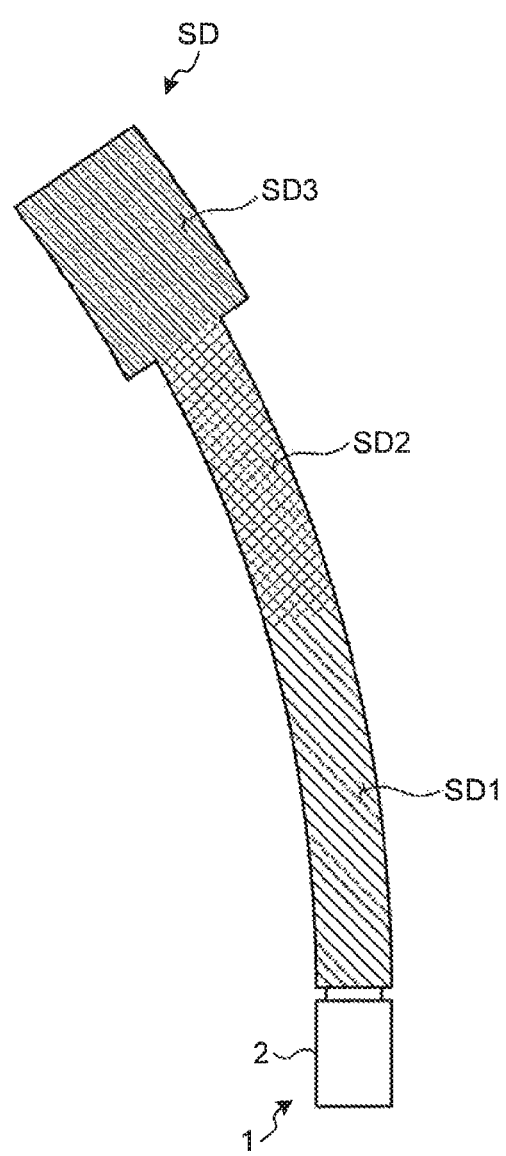
FIG. 16 is a diagram illustrating an example of the specific detection area.
Figure 17:
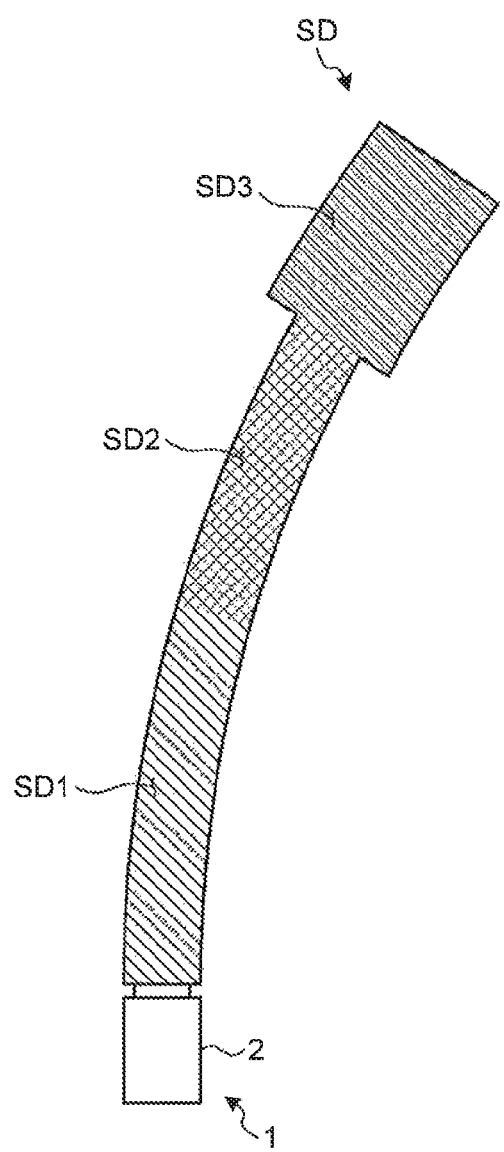
FIG. 17 is a diagram illustrating an example of the specific detection area.

The traveling direction detection device 10B may detect the traveling direction of the dump truck 1. The specific detection area setting unit 36 changes the shape of the specific detection area SD based on the traveling direction (the steering direction) of the dump truck 1 detected by the traveling direction detection device 10B. As illustrated in FIG. 16, the specific detection area setting unit 36 bends the shape of the specific detection area SD so that the front end portion of the specific detection area SD (the front end portion of the third portion SD3) moves leftward with respect to the dump truck 1 when the traveling direction of the dump truck 1 changes leftward. As illustrated in FIG. 17, the specific detection area setting unit 36 bends the shape of the specific detection area SD so that the front end portion of the specific detection area SD (the front end portion of the third portion SD3) moves rightward with respect to the dump truck 1 when the traveling direction of the dump truck 1 changes rightward (the vehicle makes a right turn). The curved state of the shape of the specific detection area SD is involved with the traveling direction (the steering direction) of the dump truck 1 detected by the traveling direction detection device 10B.

The relative position between the base end portion of the specific detection area SD (the base end portion of the first portion SD1) and the dump truck 1 does not change. When the length of the second dimension L of the specific detection area SD is changed, the specific detection area setting unit 36 does not change the relative position between the base end portion of the specific detection area SD and the dump truck 1, but changes the position of the front end portion of the specific detection area SD with respect to the traveling direction of the dump truck 1. For example, when the length of the second dimension L of the specific detection area SD is shortened, the specific detection area setting unit 36 does not change the relative position between the base end portion of the specific detection area SD and the dump truck 1, but changes the relative position between the front end portion of the specific detection area SD and the dump truck 1 so that the front end portion of the specific detection area SD moves close to the dump truck 1. When the length of the second dimension L of the specific detection area SD is lengthened, the specific detection area setting unit 36 does not change the relative position between the base end portion of the specific detection area SD and the dump truck 1, but changes the relative position between the front end portion of the specific detection area SD and the dump truck 1 so that the front end portion of the specific detection area SD moves away from the dump truck 1.

Further, when the specific detection area SD is bent, the specific detection area setting unit 36 does not change the relative position between the base end portion of the specific detection area SD and the dump truck 1, but changes the position of the front end portion of the specific detection area SD with respect to the width direction of the dump truck 1. For example, when the specific detection area SD is bent leftward, the specific detection area setting unit 36 does not change the relative position between the base end portion of the specific detection area SD and the dump truck 1, but changes the relative position between the front end portion of the specific detection area SD and the dump truck 1 so that the front end portion of the specific detection area SD moves leftward with respect to the dump truck 1. When the specific detection area SD is bent rightward, the specific detection area setting unit 36 does not change the relative position between the base end portion of the specific detection area SD and the dump truck 1, but changes the relative position between the front end portion of the specific detection area SD and the dump truck 1 so that the front end portion of the specific detection area SD moves rightward with respect to the dump truck 1.

Furthermore, the base end portion of the specific detection area SD indicates the end portion which is closest to the dump truck 1 in the traveling direction of the dump truck 1 in the specific detection area SD. The front end portion of the specific detection area SD indicates the end portion which is farthest from the dump truck 1 in the traveling direction of the dump truck 1 in the specific detection area SD. The base end portion of the specific detection area SD includes the base end portion of the first portion SD1. The front end portion of the specific detection area SD includes the front end portion of the third portion SD3. In the embodiment, the specific detection area SD is set so that the base end portion of the specific detection area SD and the front part of the dump truck 1 are connected (adjacent) to each other.

The specific detection area setting unit 36 may change the shape of the specific detection area SD based on the loaded state of the load of the vessel 3. In the embodiment, the loaded state of the load includes at least one of the existence of the load in the vessel 3 and the weight of the load in the vessel 3.

The loading state detection device 11 may detect the existence of the load in the vessel 3 and the weight of the load in the vessel 3. The specific detection area setting unit 36 changes the length of the second dimension L of the specific detection area SD based on the existence of the load detected by the loading state detection device 11. The specific detection area setting unit 36 shortens the length of the second dimension L of the specific detection area SD when no load exists (the total weight of the dump truck 1 is light). The specific detection area setting unit 36 lengthens the length of the second dimension L of the specific detection area SD when a load exists (the total weight of the dump truck 1 is heavy). Further, the specific detection area setting unit 36 may change the length of the specific detection area SD based on the weight of the load detected by the loading state detection device 11 instead of the existence of the load. The specific detection area setting unit 36 shortens the length of the specific detection area SD when the weight of the load is light (the amount of the load is small). The specific detection area setting unit 36 lengthens the length of the specific detection area SD when the weight of the load is heavy (the amount of the load is large).

The collision determination unit 31 determines the possibility of the collision between the dump truck 1 and the object at the front side of the dump truck 1 by determining whether the object exists in the specific detection area SD based on the detection result of the object detection device 31. The existence of the object in the specific detection area SD indicates the state where the possibility of the collision between the dump truck 1 and the object increases.

For example, when the relative speed between the dump truck 1 and the object is high, the dump truck 1 and the object move close to each other in a short time, and hence there is a high possibility of the collision. When a load exists in the vessel 3, the traveling dump truck 1 may not easily stop due to the weight of the load, and hence there is a high possibility of the collision.

When the traveling condition of the dump truck 1 is a traveling condition having a high possibility of the collision, the specific detection area setting unit 36 lengthens the length of the specific detection area SD. For example, when the loaded state of the load of the vessel 3 is a loaded state having a high possibility of the collision, the specific detection area setting unit 36 lengthens the length of the second dimension L of the specific detection area SD. Accordingly, even when the object at the front side of the dump truck 1 moves away from the dump truck 1, the object may be recognized inside the specific detection area SD. For that reason, even when the object at the front side of the dump truck 1 moves away from the dump truck 1, the collision determination unit 31 may determine that the object exists in the specific detection area SD by recognizing the object inside the specific detection area SD, and hence the possibility of the collision may be determined.

Meanwhile, when the traveling condition of the dump truck 1 is a traveling condition having a low possibility of the collision, the specific detection area setting unit 36 shortens the length of the second dimension L of the specific detection area SD. When the loaded state of the load of the vessel 3 is a loaded state having a low possibility of the collision, the specific detection area setting unit 36 shortens the length of the specific detection area SD. Accordingly, when the object at the front side of the dump truck 1 moves away from the dump truck 1, the object does not exist inside the specific detection area SD. For that reason, when the object at the front side of the dump truck 1 moves away from the dump truck 1, the collision determination unit 31 may determine that the object does not exist in the specific detection area SD, and hence the low possibility of the collision may be determined.

The traveling condition of the dump truck 1 having a high possibility of the collision includes a traveling condition in which the relative speed between the dump truck 1 and the object is high. Alternatively, the traveling condition of the dump truck 1 having a high possibility of the collision includes a traveling condition in which the traveling speed of the dump truck 1 is high. Meanwhile, the traveling condition of the dump truck 1 having a low possibility of the collision includes a traveling condition in which the relative speed between the dump truck 1 and the object is low. Alternatively, the traveling condition of the dump truck 1 having a low possibility of the collision includes a traveling condition in which the traveling speed of the dump truck 1 is low. When the relative speed or the traveling speed of the dump truck 1 is high, the possibility of the collision increases. When the relative speed or the traveling speed of the dump truck 1 is low, the possibility of the collision decreases. That is, when the relative speed between the dump truck 1 and the object is high or the traveling speed of the dump truck 1 is high as the traveling condition in which the possibility of the collision of the dump truck 1 is high, the specific detection area setting unit 36 lengthens the length of the specific detection area SD.

The loaded state of the load having a high possibility of the collision includes a loaded state in the vessel 3. The loaded state of the load having a high possibility of the collision includes a loaded state where the weight of the load of the vessel 3 is heavy. The loaded state of the load having a low possibility of the collision includes a loaded state where no load exists in the vessel 3. The loaded state of the load having a low possibility of the collision includes a loaded state where the weight of the load of the vessel 3 is light. As described above, when the weight of the dump truck 1 is large (that is, when the load exists or the weight of the load is heavy), the deceleration of the dump truck 1 decreases, and hence the traveling dump truck 1 may not easily stop. As a result, the possibility of the collision increases. When the weight of the dump truck 1 is small (that is, no load exists or the weight of the load is light), the deceleration of the dump truck 1 increases, and hence the traveling dump truck 1 may easily stop. As a result, the possibility of the collision decreases.

As described above, the specific detection area SD includes the first portion SD1 which is close to the dump truck 1, the second portion SD2 which is close to the dump truck 1 next to the first portion SD1, and the third portion SD3 which is far from the dump truck 1.

Here, an example of a method of determining the second dimension L of the specific detection area SD will be described. The second dimension L changes in [Case 1] to [Case 5]. Furthermore, [Case 5] includes a case where the shape of the specific detection area SD is bent.

[Case 1] The second dimension L changes when the relative speed with respect to the object at the front side of the dump truck 1 changes.

[Case 2] The second dimension L changes by the existence of the load of the vessel 3 in the dump truck 1.

[Case 3] The second dimension L changes when the traveling speed of the dump truck 1 changes.

[Case 4] The second dimension L changes when the weight (the weight of the load) of the vessel 3 of the dump truck 1 changes.

[Case 5] The second dimension L changes when the traveling direction of the dump truck 1 (the operation amount of the traveling direction operation unit 15 and the turning amount of the handle operation unit) changes.

Figure 18:
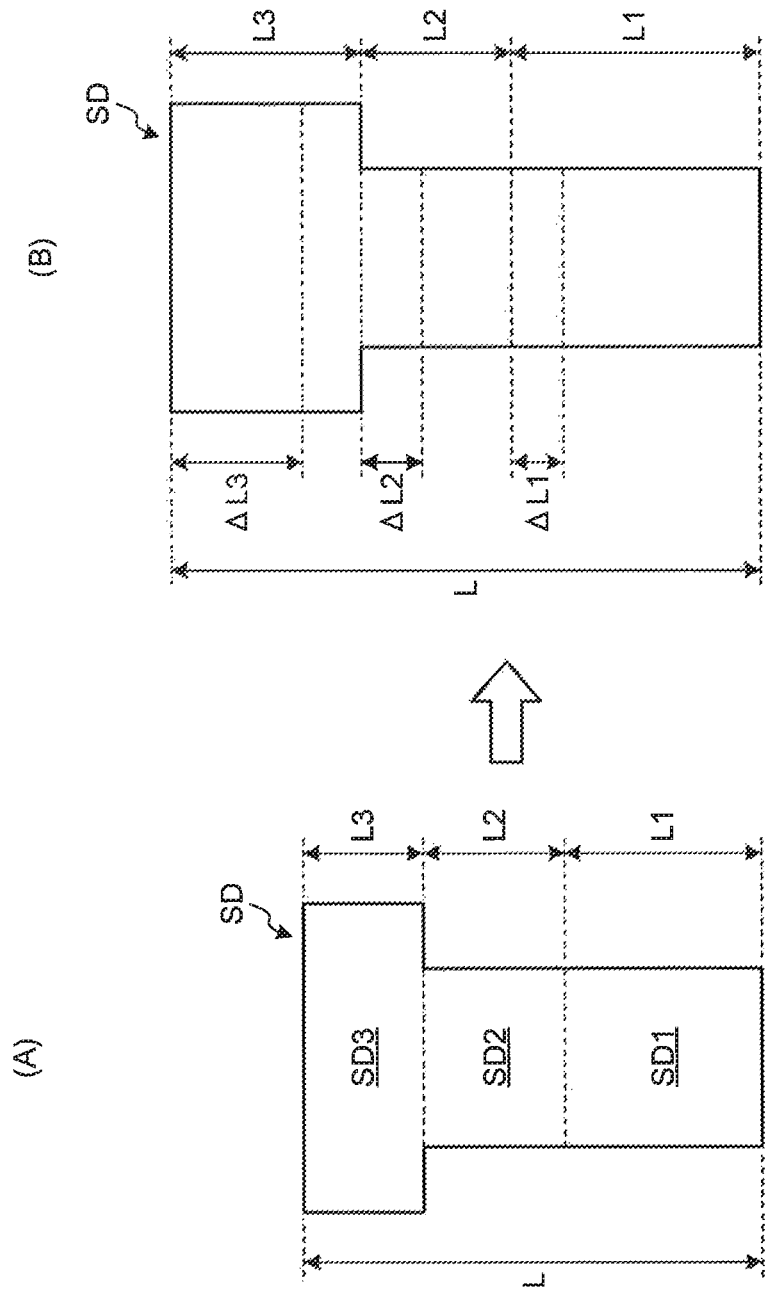
FIG. 18 is a schematic diagram illustrating an example of a method of determining a second dimension.

FIG. 18 is a schematic diagram illustrating an example of a method of determining the second dimension L in the case of the combination of [Case 1] and [Case 2]. As illustrated in FIG. 18(A), the second dimension L is determined in response to the relative speed in the empty state (the state without a load). Further, when the relative speed is the same in the loaded state (the state with a load), a dimension obtained by adding a predetermined dimension ΔL to the dimension L is used as the second dimension L as illustrated in FIG. 18(B). ΔL is distributed to each of the dimension L1 of the first portion SD1, the dimension L2 of the second portion SD2, and the dimension L3 of the third portion SD3. A dimension obtained by adding the dimension ΔL1 to the dimension L1 is set as the dimension L1 of the first portion SD1. A value obtained by adding the dimension ΔL2 to the dimension L2 is set as the dimension L2 of the second portion SD2. A value obtained by adding the dimension ΔL3 to the dimension L3 is set as the dimension L3 of the third portion SD3. An equation of ΔL=ΔL1+ΔL2+ΔL3 is satisfied.

Figure 19:
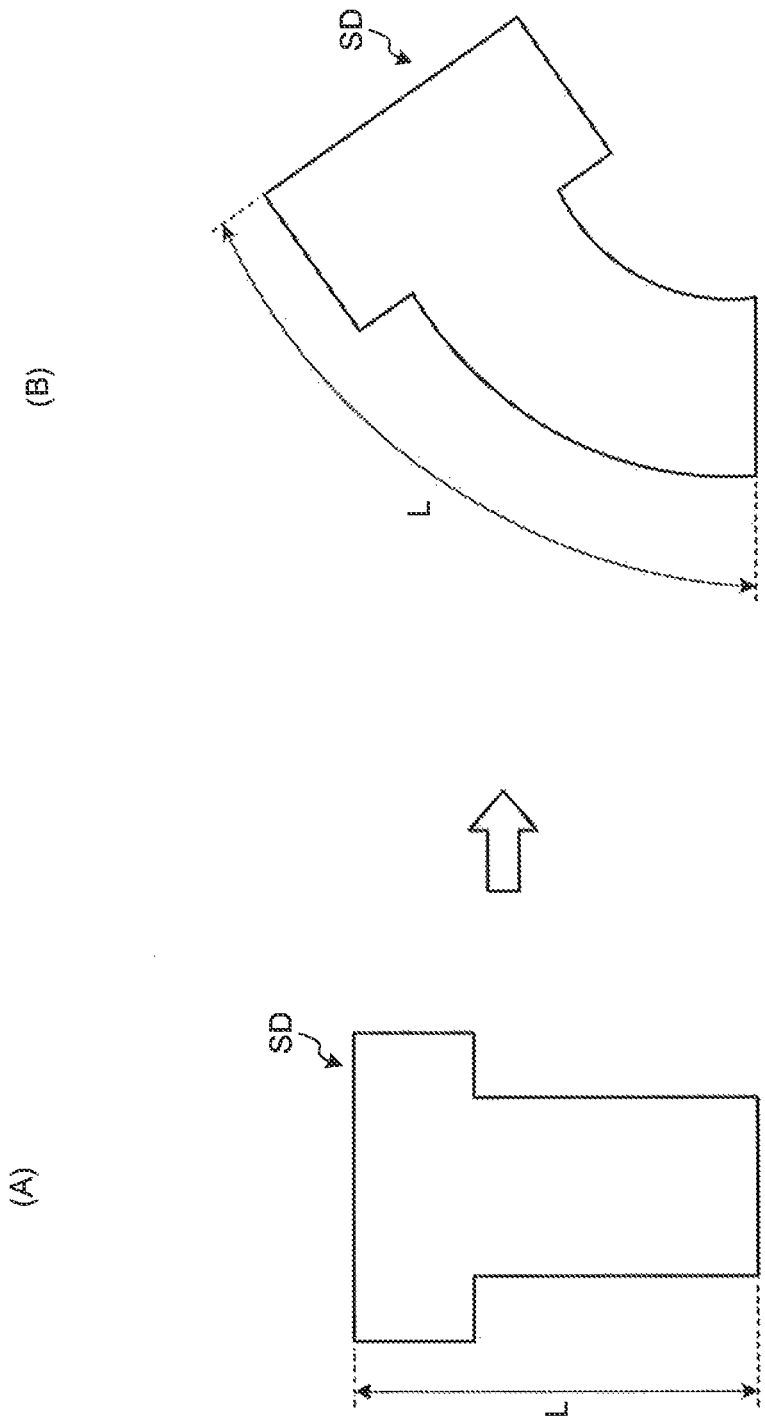
FIG. 19 is a schematic diagram illustrating an example of a method of determining the second dimension.

FIG. 19 is a schematic diagram illustrating an example of a method of determining the second dimension L in the case of the combination of [Case 1] and [Case 5]. As illustrated in FIG. 19(A), the second dimension L is determined in response to the relative speed. As illustrated in FIG. 19(B), the shape of the specific detection area SD may be bent based on the turning amount of the handle operation unit. When the weight of the load does not change and the relative speed also does not change, the second dimension L illustrated in FIG. 19(A) is equal to the second dimension L illustrated in FIG. 19(B).

Figure 20:
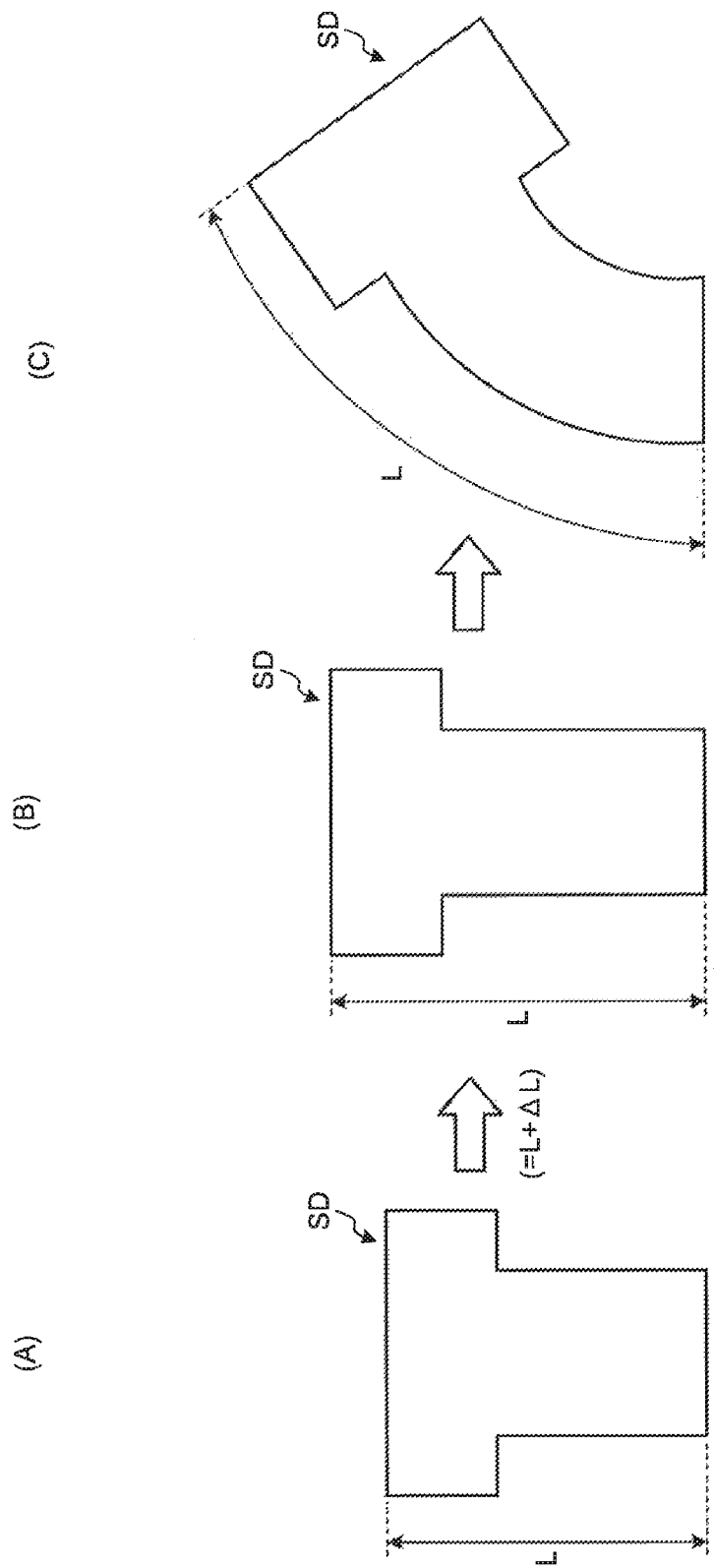
FIG. 20 is a schematic diagram illustrating an example of a method of determining the second dimension.

FIG. 20 is a schematic diagram illustrating an example of a method of determining the second dimension L in the case of the combination of [Case 1], [Case 2], and [Case 5]. As illustrated in FIG. 20(A), in the case of the empty state, the second dimension L is determined in response to the relative speed. In the case of the loaded state, a dimension obtained by adding a predetermined dimension ΔL to the dimension L is set as the second dimension L as illustrated in FIG. 20(B). As illustrated in FIG. 20(C), the shape of the specific detection area SD may be bent based on the turning amount of the handle operation unit. When the handle operation unit is turned in the loaded state, the second dimension L illustrated in FIG. 20(B) is equal to the second dimension L illustrated in FIG. 20(C).

Furthermore, the second dimension L is determined in accordance with the above-described determination method when one or both of [Case 3] and [Case 4] is further combined with the combination described with reference to FIGS. 18, 19, and 20.

Figure 21:
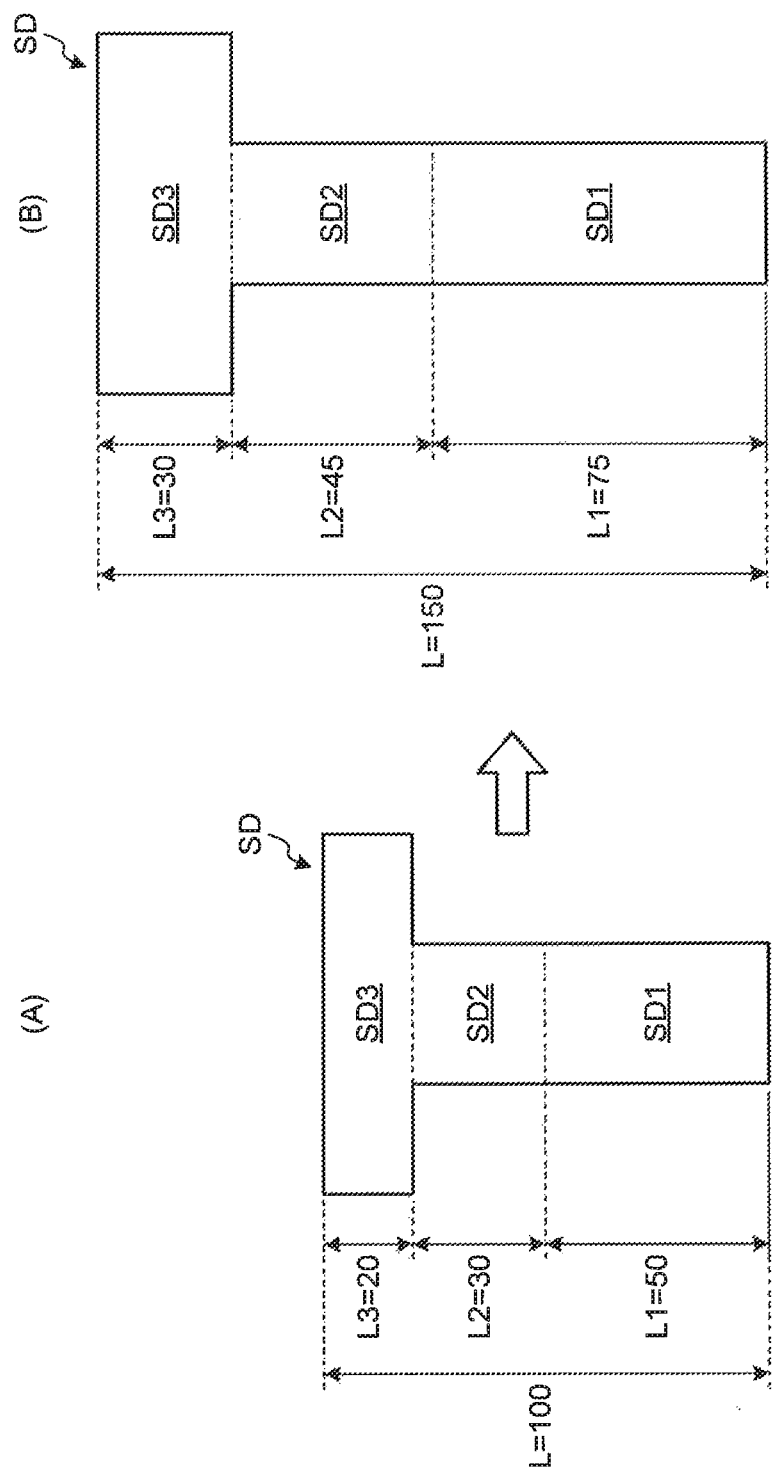
FIG. 21 is a schematic diagram illustrating an example of a method of determining the second dimension.

Next, an example of a change amount of each of the dimension L1 of the first portion SD1, the dimension L2 of the second portion SD2, and the dimension L3 of the third portion SD3 when the second dimension L changes will be described with reference to FIG. 21. As described above with reference to FIG. 18, a dimension obtained by adding a predetermined dimension ΔL to the dimension L is set as the second dimension L when the second dimension L is lengthened in response to the relative speed. ΔL is distributed to each of the dimension L1 of the first portion SD1, the dimension L2 of the second portion SD2, and the dimension L3 of the third portion SD3.

In the embodiment, the ratio of the dimension L1 of the first portion SD1, the dimension L2 of the second portion SD2, and the dimension L3 of the third portion SD3 is determined. When the second dimension L of the specific detection area SD is lengthened, the dimension L1 of the first portion SD1, the dimension L2 of the second portion SD2, and the dimension L3 of the third portion SD3 are respectively lengthened while the ratio of the dimension L1 of the first portion SD1, the dimension L2 of the second portion SD2, and the dimension L3 of the third portion SD3 is maintained.

For example, as illustrated in FIG. 21(A), it is assumed that the second dimension L is 100, the dimension L1 is 50, the dimension L2 is 30, and the dimension L3 is 20 in the initial state of the second dimension L. In this case, the relation of the dimension 1, the dimension L2, and the dimension L3 is set to 5:3:2.

As illustrated in FIG. 21(B), the second dimension L is lengthened to 150. The ratio of the dimension 1, the dimension L2, and the dimension L3 is maintained at 5:3:2. Accordingly, the dimension L1 becomes 75, the dimension L2 becomes 45, and the dimension L3 becomes 30.

Furthermore, when the second dimension L of the specific detection area SD is lengthened, only the dimension (any dimension of the dimension L1, the dimension L2, and the dimension L3) of any specific detection area SD may be lengthened or the dimensions (the dimension L1, the dimension L2, and the dimension L3) of the specific detection areas SD may be lengthened at a ratio different from the ratio obtained before the second dimension L is lengthened instead of maintaining the ratio of the dimension L1 of the first portion SD1, the dimension L2 of the second portion SD2, and the dimension L3 of the third portion SD3.

As described above, in the embodiment, the determination of the collision determination unit 31 includes a case where the possibility of the collision is classified into plural levels. The collision determination unit 31 divides the possibility of the collision into Level 1 in which the collision of possibility is the highest, Level 2 in which the possibility of the collision is high next to Level 1, and Level 3 in which the possibility of the collision is low. In the embodiment, the specific detection area setting unit 36 divides the specific detection area SD into a plurality of (in this example, three) portions (the first portion SD1, the second portion SD2, and the third portion SD3) based on the levels (the collision possibility levels). The collision determination unit 36 determines that the collision possibility level is Level 1 when it is determined that the object exists in the first portion SD1 based on the detection result of the object detection device 12. The collision determination unit 36 determines that the collision possibility level is Level 2 when it is determined that the object exists in the second portion SD2 based on the detection result of the object detection device 12. The collision determination unit 36 determines that the collision possibility level is Level 3 when it is determined that the object exists in the third portion SD3 based on the detection result of the object detection device 12.

The control unit 36 outputs the control signal C for reducing damage caused by the collision to the process system 600 based on the determination result of the collision determination unit 36. For example, when the collision determination unit 36 determines that the collision possibility level is Level 2, the control unit 36 outputs the control signal C so that the brake device including the brake device 13 and the retarder 28 becomes a weak brake state. When the collision determination unit 36 determines that the collision possibility level is Level 1, the control unit 36 outputs the control signal C so that the brake device including the brake device 13 and the retarder 28 becomes a full brake state. Furthermore, the control unit 36 may output the control signal C to a specific process device in the process system 600 based on the collision possibility level. For example, when the collision determination unit 36 determines that the collision possibility level is Level 2, the control unit 36 may output the control signal C so that the alarm device 21 is operated. When the collision determination unit 36 determines the collision possibility level is Level 1, the control unit 36 may output the control signal C so that the brake device is operated.

(Control Method)

Figure 22:
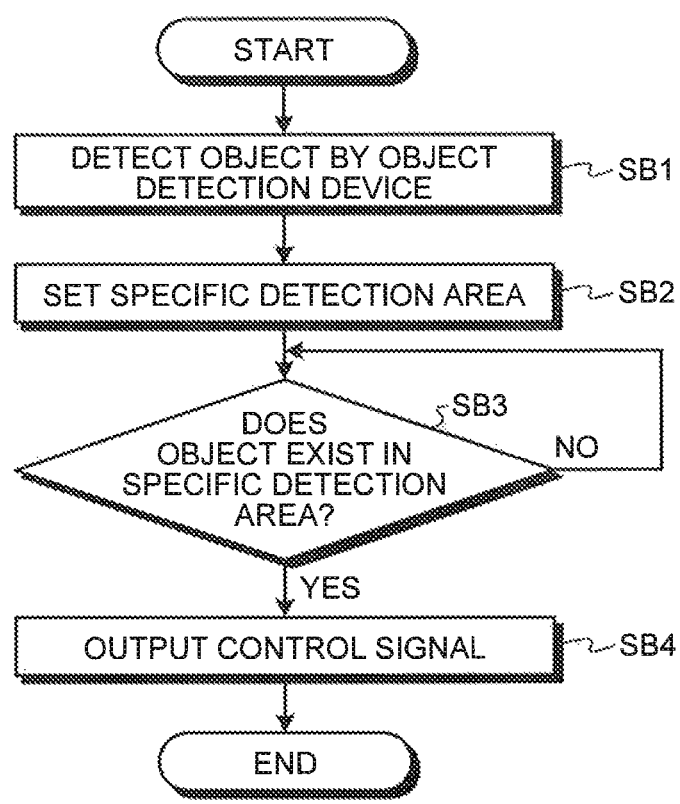
FIG. 22 is a flowchart illustrating an example of a method of controlling the transporter vehicle.

Next, an example of a method of controlling the dump truck 1 according to the embodiment will be described with reference to the flowchart of FIG. 22.

The object at the front side of the dump truck 1 is detected by the object detection device 12 provided in the dump truck 1 (step SB1).

The detection result of the object detection device 12 is input to the determination unit 37. The determination unit 37 determines whether to set the specific detection area SD in the detection area SL based on the detection result of the object detection device 12.

Figure 23:
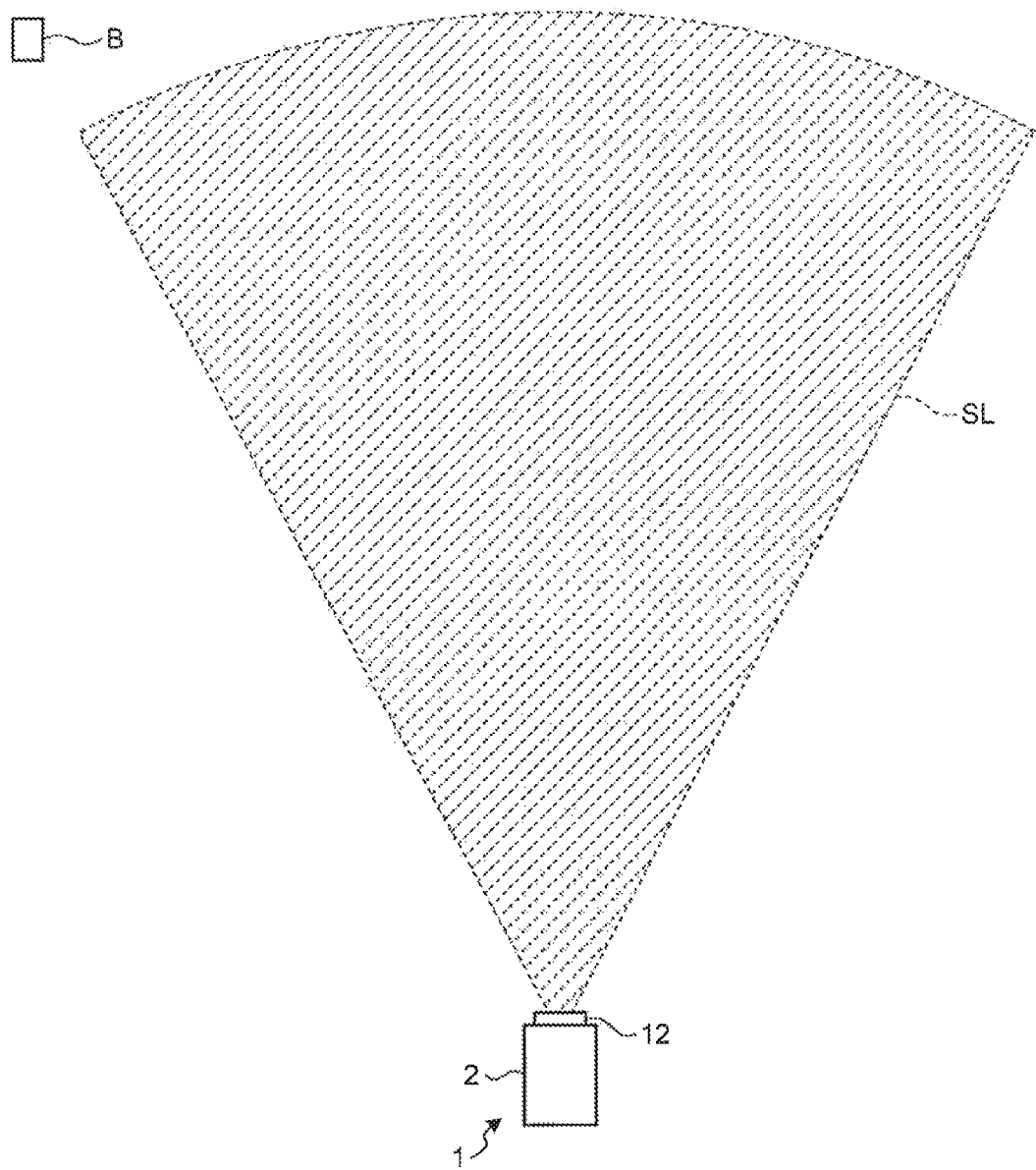
FIG. 23 is a schematic diagram illustrating an example of a method of controlling the transporter vehicle.

FIG. 23 is a schematic diagram illustrating an example of a positional relation between the object B and the detection area SL. The object B may be the other dump truck 1F existing at the front side of the dump truck 1 or may be a vehicle different from the dump truck. FIG. 23 illustrates an example in which the object B exists outside the detection area SL of the object detection device 12. As illustrated in FIG. 23, when the object B exists outside the detection area SL, the determination unit 37 determines that the specific detection area SD will not be set.

Figure 24:
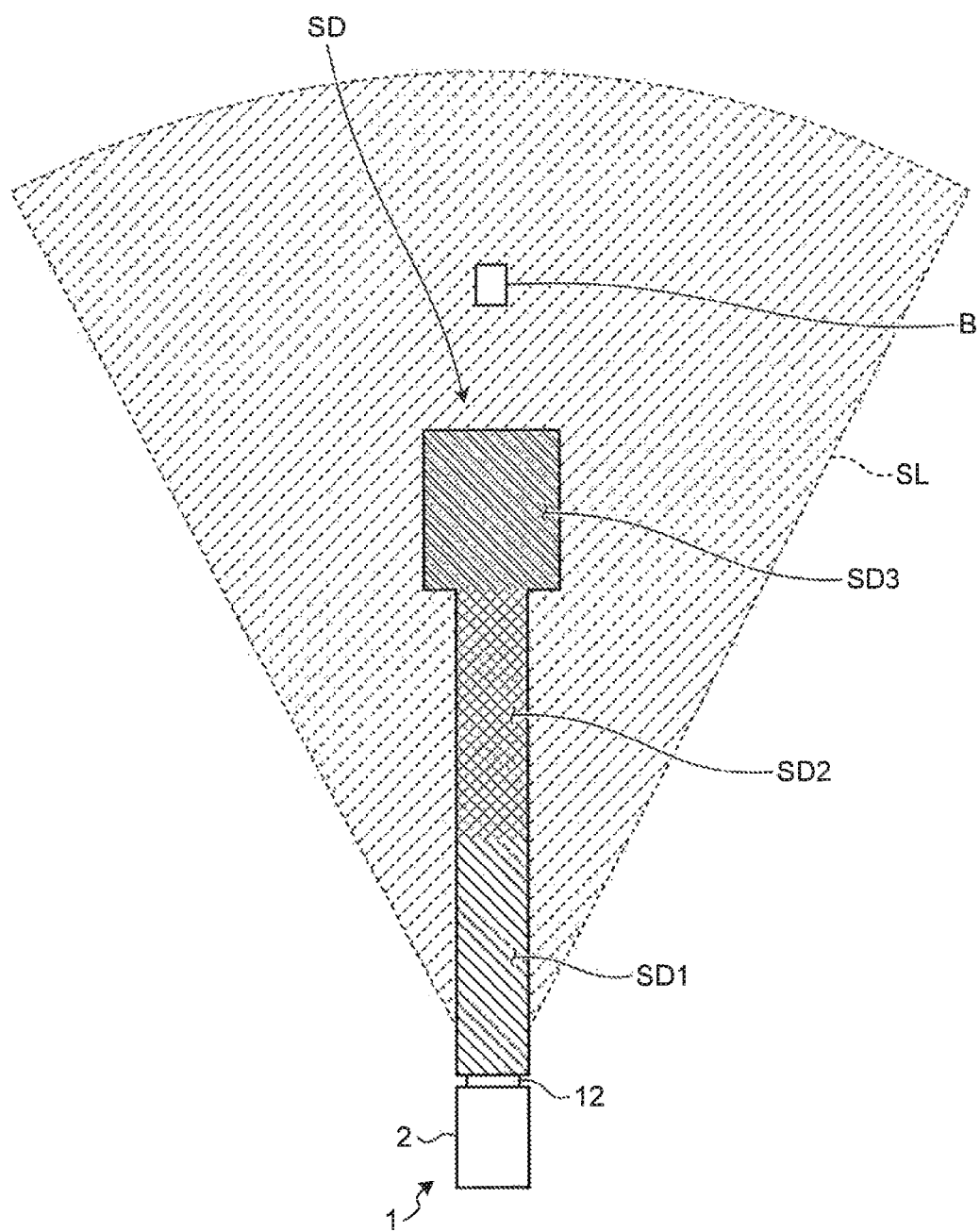
FIG. 24 is a schematic diagram illustrating an example of a method of controlling the transporter vehicle.

FIG. 24 is a schematic diagram illustrating an example of a positional relation between the object B and the detection area SL. FIG. 24 illustrates an example in which the object B exists inside the detection area SL of the object detection device 12. As illustrated in FIG. 24, when the object B exists inside the detection area SL, the determination unit 37 determines that the specific detection area SD will be set.

When it is determined that the object B exists inside the detection area SL based on the detection result of the object detection device 12, the specific detection area setting unit 36 further sets the specific detection area SD inside the detection area SL (step SB2).

The collision determination unit 31 determines whether the object B exists in the specific detection area SD based on the detection result of the object detection device 12 (step SB3).

Figure 25:
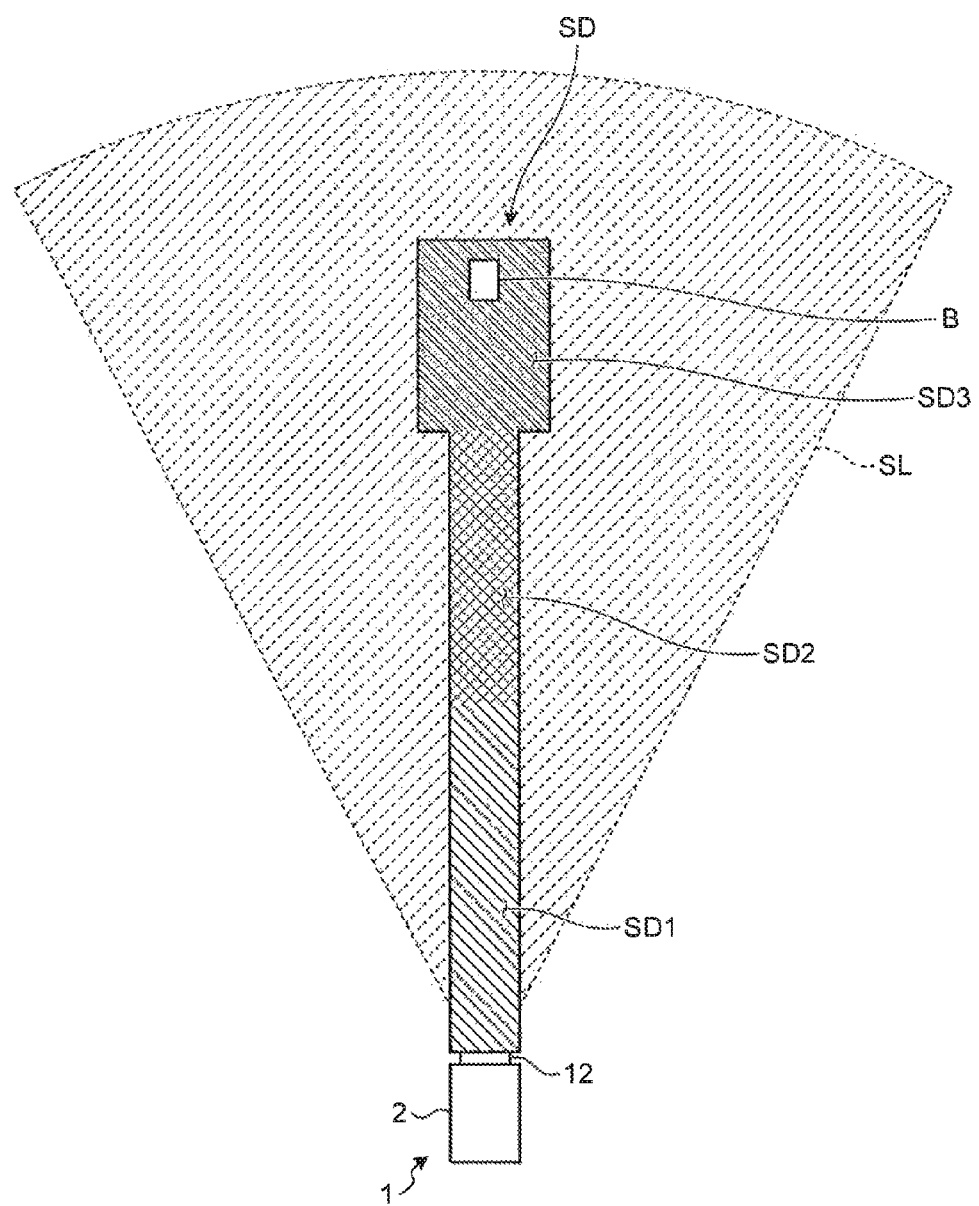
FIG. 25 is a schematic diagram illustrating an example of a method of controlling the transporter vehicle.

FIG. 24 illustrates an example in which the object B exists inside the detection area SL and the object B does not exist in the specific detection area SD. Meanwhile, FIG. 25 illustrates an example in which the object B exists in the specific detection area SD.

In step SB3, when it is determined that the object B does not exist in the specific detection area SD (No in step SB3), the control signal C is not output from the control unit 35. That is, in the embodiment, even when the object B exists in the detection area SL, the control signal C is not output from the control unit 35 (the process system 600 is not operated) as long as the object B exists in the specific detection area SD.

In step SB3, when it is determined that the object B exists in the specific detection area SD (Yes in step SB3), the control unit 35 outputs the control signal C for reducing damage caused by the collision to the process system 600 (step SB4).

For example, when it is determined that the collision possibility level is Level 1 (the object B exists in the first portion SD1), the control unit 35 outputs the control signal C to the brake device so as to realize the full brake state. When it is determined that the collision possibility level is Level 2 (the object exists in the second portion SD2), the control unit 35 outputs the control signal C to the brake device so as to realize the weak brake state.

(Plural Objects in Detection Area)

Figure 26:
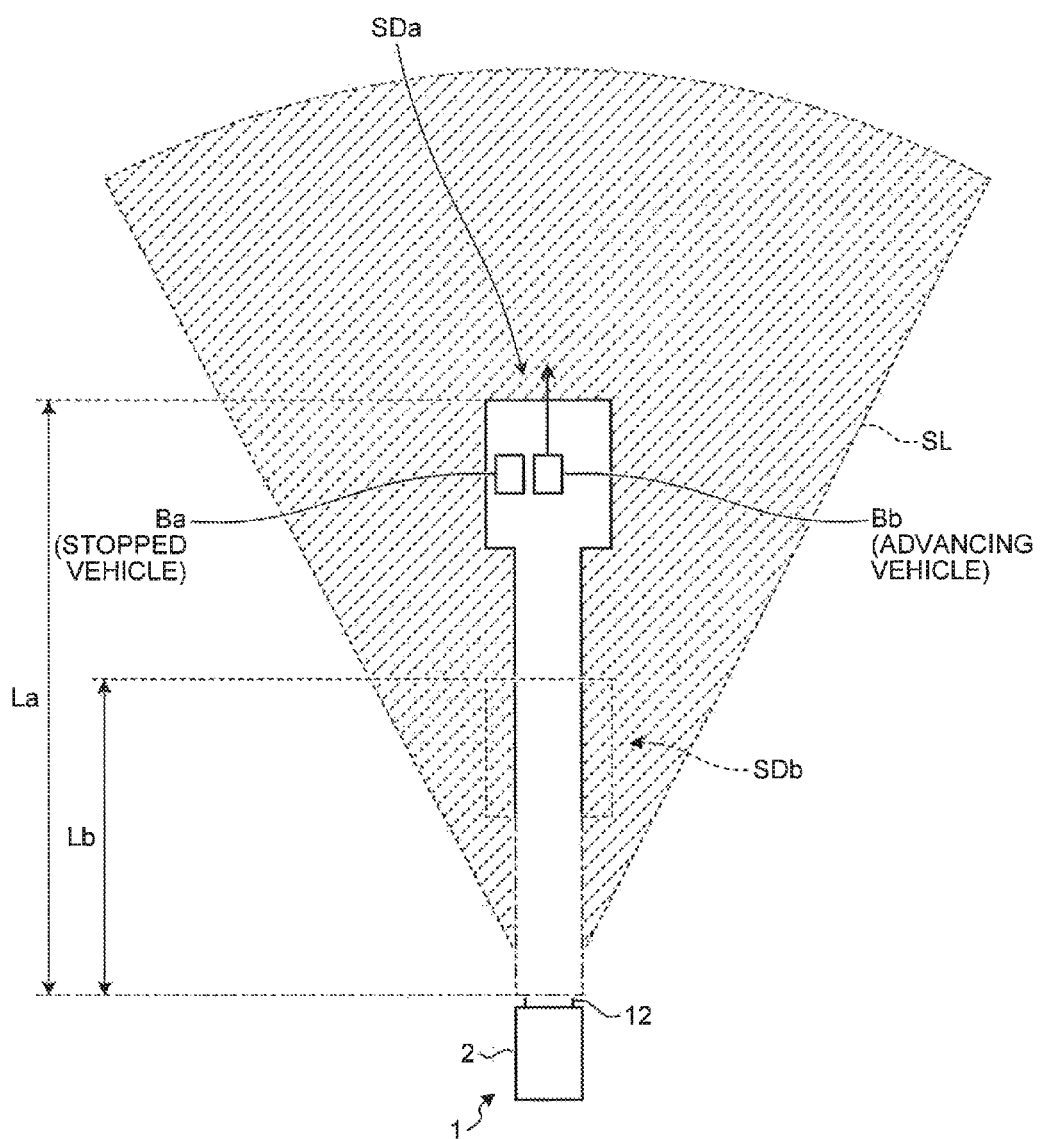
FIG. 26 is a schematic diagram illustrating an example of a method of controlling the transporter vehicle.

Next, a case where a plurality of objects B exist in the detection area SL will be described with reference to FIG. 26. FIG. 26 illustrates an example in which a first object Ba and a second object Bb exist in the detection area SL.

The specific detection area setting unit 36 sets a first specific detection area SDa corresponding to the first object Ba and a second specific detection area SDb corresponding to the second object Bb based on the detection result of the object detection device 12. In FIG. 26, the first specific detection area SDa indicates an area which is surrounded by the solid line and the one-dotted chain line, and the second specific detection area SDb indicates an area which is surrounded by the dashed line and the one-dotted chain line.

The shape (the length) of the first specific detection area SDa is set based on, for example, the relative speed between the first object Ba and the dump truck 1. The shape (the length) of the second specific detection area SDb is set based on, for example, the relative speed between the second object Bb and the dump truck 1. In the example illustrated in FIG. 26, when the dump truck 1 advances, the first object Ba stops, and the second object Bb advances in the same direction as the dump truck 1. Accordingly, in the example illustrated in FIG. 26, the relative speed between the first object Ba and the dump truck 1 is larger than the relative speed between the second object Bb and the dump truck 1. The possibility of the collision between the dump truck 1 and the first object Ba is higher than the possibility of the collision between the dump truck 2 and the second object Bb. Therefore, as illustrated in FIG. 26, the specific detection area setting unit 36 sets the first specific detection area SDa and the second specific detection area SDb so that the length of the second dimension L(La) of the first specific detection area SDa becomes longer than that of the second dimension L(Lb) of the second specific detection area SDb.

The collision determination unit 31 specifies the object B having a high possibility of the collision with the dump truck 1 among the first object Ba and the second object Bb. The collision determination unit 31 determines whether the first object Ba exists in the first specific detection area SDa and the second object Bb exists in the second specific detection area SDb. In the example illustrated in FIG. 26, the collision determination unit 31 determines that the first object Ba exists in the first specific detection area SDa and the second object Bb does not exist in the second specific detection area SDb. Accordingly, the collision determination unit 31 determines that the first object Ba existing in the first specific detection area SDa is the object B having a high possibility of the collision with the dump truck 1 in relation to the second object Bb.

The control unit 35 outputs the control signal C for reducing damage caused by the collision with the object B having a high possibility of the collision (in this example, the first object Ba) among the first object Ba and the second object Bb to the process system 600.

(Third Portion)

Figure 27:
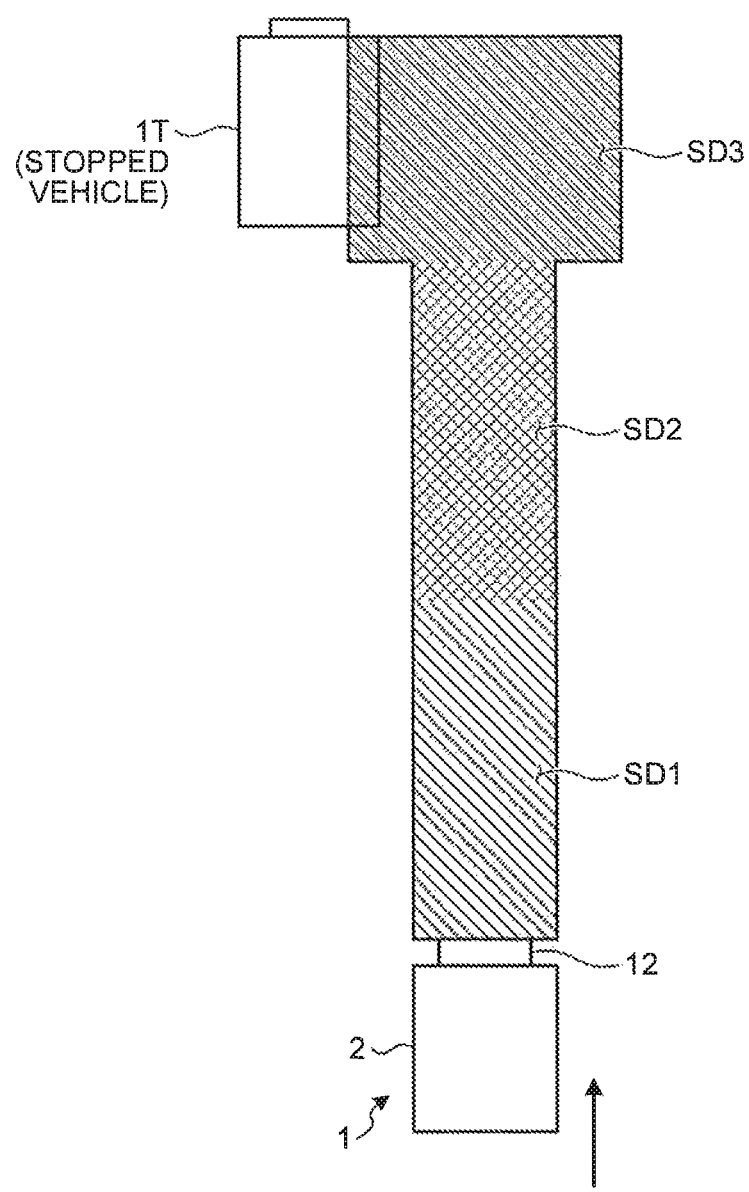
FIG. 27 is a schematic diagram illustrating an example of a method of controlling the transporter vehicle.

FIG. 27 is a diagram illustrating an example of a state where the dump truck 1 overtakes a dump truck 1T stopping at the front side thereof. As described above with reference to FIG. 3 and the like, the dimension W3 of the width of the third portion SD3 is larger than the dimension W1 of the width of the first portion SD1 and the dimension W2 of the width of the second portion SD2. Accordingly, when the dump truck 1 travels while overtaking the dump truck 1T stopping at the front side thereof, it is possible to detect a case where at least a part of the dump truck 1T exists in the third portion SD3 of the specific detection area SD at a position separated from the dump truck 1. When at least a part of the dump truck 1T is detected in the third portion SD3, the control unit 35 outputs the control signal C so as to operate the alarm device 21. Accordingly, it is possible to call the attention of the driver WM that drives the dump truck 1, and hence the dump truck 1 is operated so that the dump truck 1 smoothly overtakes the dump truck 1T.

Furthermore, when at least a part of the dump truck 1T is detected in the third portion SD3 even when the front dump truck 1T travels toward the dump truck 1, the control unit 35 outputs the control signal C so as to operate the alarm device 21. Accordingly, even in this case, it is possible to call the attention of the driver WM, and hence the dump truck 1 is operated so that the dump truck 1 smoothly overtakes the dump truck 1T.

When the specific detection area SD does not have the third portion SD3 and the specific detection area SD has a uniform width, the front object B is not included in the specific detection area SD even when the handle operation unit is finely operated, and hence the object B may not be detected. Accordingly, since the dimension W3 of the width of the third portion SD3 is larger than the dimension W1 of the width of the first portion SD1 and the dimension W2 of the width of the second portion SD2, it is possible to reliably detect the object B existing at the far front position even when the driver WM drives the dump truck 1 while finely adjusting the traveling direction operation unit 15 (the handle) rightward and leftward.

(Cancellation of Specific Detection Area)

The traveling direction of the dump truck 1 is adjusted by the steering device 14. The steering device 14 may change the traveling direction of the dump truck 1 so that one of the straight movement state and the non-straight movement state changes to the other thereof.

In the embodiment, the invalidation unit 38 invalidates (cancels or deletes) the specific detection area SD when a change amount in the traveling direction of the dump truck 1 from the straight movement state is equal to or larger than a threshold value. For example, when the traveling direction of the dump truck 1 in the straight movement state changes by a predetermined angle (a threshold value) or more based on a predetermined traveling direction (for example, the straight movement direction), the specific detection area SD is invalidated.

When the steering angle set by the steering device 14 is large, that is, the traveling direction operation unit 15 (the handle) is largely changed by the driver WM, there is a decrease in possibility that the dump truck 1 collides with the front object B. Further, since the intension (the attention) of the driver WM is enough in the state where the handle is steered, the possibility of the collision decreases. Therefore, when a change amount in the traveling direction of the dump truck 1 from the straight movement state becomes a predetermined threshold value or more, the specific detection area SD is invalidated. Accordingly, it is possible to prevent a problem in which the control unit 35 excessively outputs the control signal C even when the object B exists in the detection area SL, and hence the excessive operation of the process system 600 is suppressed.

Further, in the embodiment, the invalidation unit 38 invalidates the specific detection area SD when the traveling speed of the dump truck 1 is a predetermined threshold value or less. For example, the specific detection area SD is invalidated when the time in which the vehicle travels at a low speed of 10 km/h or less is maintained for a predetermined time or more.

For example, there is a possibility that the dump truck 1 may travel at a low speed in the loading field LPA and the soil disposal field DPA. Further, there is a possibility that the other dump truck 1 may exist in the loading field LPA and the soil disposal field DPA. Alternatively, there is a possibility that a construction vehicle such as a bulldozer or a loading machine such as an excavator may exist in the loading field LPA and the soil disposal field DPA. When the specific detection area SD is set in the loading field LPA and the soil disposal field DPA and the other dump truck 1 exists in the specific detection area SD, the brake device of the dump truck 1 is operated, and hence the work efficiency is degraded. Therefore, when the dump truck 1 travels at the traveling speed of a predetermined threshold value or less in the loading field LPA and the soil disposal field DPA, the specific detection area SD is invalidated. Accordingly, it is possible to prevent a problem in which the control unit 35 excessively outputs the control signal C even when the object B (for example, the other dump truck 1) exists in the detection area SL, and hence to suppress the excessive operation of the process system 600.

Further, in the embodiment, the invalidation unit 38 invalidates the specific detection area SD when the dump truck 1 moves backward. The dump truck 1 includes the speed change device 80 capable of changing the advancing direction of the dump truck 1. The invalidation unit 38 may recognize whether the dump truck 1 moves forward or backward based on the operation of the speed change device 80.

When the dump truck 1 moves backward, there is a low possibility that the dump truck may collide with the front object. Therefore, the specific detection area SD is invalidated when the dump truck 1 moves backward. Accordingly, it is possible to prevent a problem in which the control unit 35 excessively outputs the control signal C even when the object B exists in the detection area SL, and hence to suppress the excessive operation of the process system 600.

Further, when the driver WM operates the brake operation unit 25, the operation is performed according to the intension of the driver WM. Therefore, the specific detection area SD may be invalidated when the driver WM operates the brake operation unit 25. The same applies to the case where the retarder operation unit 17 is operated.

Further, when the driver WM operates the output operation unit 24 (the operation of stepping on the accelerator pedal is canceled), the operation is performed according to the intension of the driver WM. Therefore, the specific detection area SD may be invalidated when the driver WM operates the output operation unit 24.

In this way, the specific detection area SD may be invalidated when the driver WM operates the operation device including at least one of the output operation unit 24, the brake operation unit 25, the traveling direction operation unit 15, the speed stage operation unit 18, and the retarder operation unit 17.

(Action)

As described above, according to the embodiment, the dump truck 1 includes the process system 600 capable of performing a process for reducing damage caused by the collision, and the control signal C for reducing damage caused by the collision is output from the control unit 35 to the process system 600 based on the determination result of the collision determination unit 31. Accordingly, it is possible to reduce damage caused by the collision between the dump truck 1 and the front dump truck 1F.

According to the embodiment, the specific detection area SD having a width and a length is set inside the detection area SL of the object detection device 12. When it is determined whether the object B exists in the specific detection area SD and it is determined that the object exists in the specific detection area SD, the control signal C for operating the process system 600 is output. Accordingly, for example, as illustrated in FIG. 24, when the object does not exist in the specific detection area SD even when the object B having a low possibility of the collision with the dump truck 1 exists in the detection area SL of the object detection device 12, the control signal C is not output, and the process system 600 is not operated. For that reason, it is possible to suppress a problem in which the traveling operation of the dump truck 1 is excessively limited. Accordingly, it is possible to suppress degradation in the work efficiency of the dump truck 1 and degradation in the productivity of the mining site.

The object B that exists in the specific detection area SD having a width and a length is the object B having a high possibility of the collision with the dump truck 1. When it is determined that the object exists in the specific detection area SD, the control signal C for operating the process system 600 is output. Accordingly, it is possible to reduce damage caused by the collision between the dump truck 1 and the object B.

In this way, according to the embodiment, since the specific detection area SD has a shape capable of detecting the object B having a high possibility of the collision and is smaller than the detection area SL, it is possible to suppress the excessive operation of the process system 600 of the collision damage reduction system 300S and to suppress degradation in the work efficiency of the dump truck 1 while reducing damage caused by the collision with the object B by detecting the object B having a high possibility of the collision.

According to the embodiment, the width of the specific detection area SD includes the dimension of the vehicle width of the dump truck 1. Accordingly, the specific detection area SD having a minimum width necessary to reduce damage caused by the collision is set. Accordingly, degradation in the work efficiency caused by the excessive operation of the process system 600 is suppressed, and hence damage caused by the collision with the object B is reduced.

According to the embodiment, the specific detection area setting unit 36 changes the shape of the specific detection area SD based on the traveling condition of the dump truck 1 including the relative speed between the dump truck 1 and the object B or the traveling speed of the dump truck 1. Accordingly, the specific detection area SD having an optimal shape and a minimum size necessary for reducing damage caused by the collision is set. Accordingly, degradation in the work efficiency caused by the excessive operation of the process system 600 is suppressed, and hence damage caused by the collision with the object B is reduced.

According to the embodiment, when the traveling direction of the dump truck 1 slightly changes, the shape of the specific detection area SD is bent based on the traveling direction. Accordingly, the specific detection area SD having an optimal shape and a minimum size necessary for reducing damage caused by the collision is set without increasing the size of the specific detection area SD. Accordingly, it is possible to accurately determine whether the object B exists in the traveling direction of the dump truck 1 and to suppress degradation in the work efficiency caused by the excessive operation of the process system 600. Thus, damage caused by the collision with the object B is reduced.

Further, since the specific detection area SD is set or the shape of the specific detection area SD is bent when the traveling direction of the dump truck 1 changes, it is possible to suppress a problem in which the side wall or the like of the traveling road is excessively detected, the brake device 13 is excessively operated, or the alarm device 21 is excessively operated.

According to the embodiment, the specific detection area setting unit 36 changes the shape of the specific detection area SD based on the loaded state of the load of the vessel 3 including the weight of the load. Accordingly, the specific detection area SD having an optimal shape and a minimum size necessary for reducing damage caused by the collision is set. Accordingly, degradation in the work efficiency of the dump truck 1 caused by the excessive operation of the process system 600 is suppressed, and hence damage caused by the collision with the object B is reduced.

According to the embodiment, the dimension W3 of the width of the third portion SD3 of the specific detection area SD is larger than the dimension W1 of the width of the first portion SD1 and the dimension W2 of the width of the second portion SD2. Accordingly, as described above with reference to FIG. 27, it is possible to detect a case where at least a part of the dump truck 1T exists in the third portion SD3 of the specific detection area SD when the dump truck 1 and the other dump truck 1T travel so as to pass by each other. When at least a part of the dump truck 1T exists in the third portion SD3, the alarm device 21 is operated. Accordingly, it is possible to call the attention of the driver WM that drives the dump truck 1 and hence to cause the dump truck 1 and the dump truck 1T to travel so as to smoothly pass by each other.

In the embodiment, the determination on the possibility of the collision with the collision determination unit 31 includes the classification of the possibility of the collision into plural levels. The control unit 35 outputs the control signal C to a specific process device among a plurality of process devices based on the level. In the embodiment, since the control signal C2 is output to the brake device 13 at Level 1 in which the possibility of the collision (the risk) is high, damage caused by the collision may be reduced. Further, since the control signal C6 is output to the alarm device 21 at Level 2 in which the possibility of the collision is comparatively low, degradation in the work efficiency of the dump truck 1 may be suppressed without the excessive operation of the brake device. In this way, since an optimal process device is selected from the plurality of process devices based on the collision possibility level and a process for reducing damage caused by the collision is performed by using the selected process device, damage caused by the collision may be reduced, and degradation in the work efficiency may be suppressed.

According to the embodiment, the specific detection area SD is classified into a plurality of portions (the first portion SD1, the second portion SD2, and the third portion SD3) based on the collision possibility level. Accordingly, when the object B exists in any one of the first portion SD1, the second portion SD2, and the third portion SD3, the control signal C for operating an appropriate process device may be output based on the collision possibility level.

In the embodiment, the process system 600 includes a plurality of process devices capable of performing different processes. For that reason, the control unit 35 may output the control signal C to an appropriate (specific) process device capable of reducing damage caused by the collision and suppressing degradation in the work efficiency among the plurality of process devices based on the determination result of the collision determination unit 31.

According to the embodiment, when the objects B (for example, the first object Ba and the second object Bb) exist in the detection area SL, the specific detection area setting unit 36 sets the specific detection areas SD (for example, the first specific detection area SDa and the second specific detection area SDb) so that the specific detection areas respectively correspond to the objects B. The collision determination unit 31 specifies the object B having a high possibility of the collision among the objects B. Accordingly, the control unit 35 may output the control signal C for reducing damage caused by the collision with the object B having a high possibility of the collision. Accordingly, even when the plurality of the objects B exist, it is possible to accurately determine the object B having a high possibility of the collision, and hence to reduce damage caused by the collision between the dump truck 1 and the object B.

According to the embodiment, the specific detection area SD is invalidated when the dump truck 1 performs a predetermined operation. The predetermined operation of the dump truck 1 includes at least one of an operation in which the traveling direction is changed by a predetermined threshold value or more from the straight movement state, an operation in which the vehicle travels at a slow traveling speed of a predetermined threshold value or less, and an operation in which the vehicle moves backward. The predetermined operation is an operation in which the possibility of the collision between the dump truck 1 and the object B is low. When the specific detection area SD is set even when a predetermined operation having a low possibility of the collision is performed, there is a possibility that the control unit 35 excessively outputs the control signal C so that the process system 600 is excessively operated. According to the embodiment, since the specific detection area SD is invalidated when a predetermined operation having a low possibility of the collision between the dump truck 1 and the object B is performed, the excessive (unnecessary) operation of the process system 600 is suppressed.

According to the embodiment, since the possibility of the collision (the crash) between the dump truck 1 and the front dump truck 1F is determined in consideration of the loading state of the load of the vessel 3, it is possible to suppress degradation in the production efficiency of the mine or degradation in the work efficiency of the dump truck 1 while reducing damage caused by the collision with the front dump truck 1F. The dump truck 1 in the empty state has a weight slightly lighter than the dump truck 1 in the loaded state, and has a high traveling performance. The traveling performance of the dump truck 1 includes at least one of the driving performance, the braking performance, and the turning performance. The dump truck 1 in the empty state having a high traveling performance may sufficiently perform a process for reducing damage caused by the collision with the object by the process system 600 compared to the dump truck 1 in the loaded state having a low traveling performance. When the traveling operation of the dump truck 1 in the empty state having a high traveling performance is limited based on the dump truck 1 in the empty state having a low traveling performance in order to reduce damage caused by the collision, the traveling operation of the dump truck 1 in the empty state is excessively limited. As a result, there is a possibility that the work efficiency of the dump truck 1 may be degraded. For example, when the traveling operation is excessively limited, the traveling speed is decreased or the traveling operation is stopped in the dump truck 1 in the empty state although there is no need to decrease the traveling speed or stop the traveling operation. According to the embodiment, since the possibility of the collision (the crash) with the front dump truck 1F is determined in consideration of the loading state of the load of the vessel 3 having a large influence on the traveling performance of the dump truck 1, it is possible to suppress a problem in which the traveling operation of the dump truck 1 in the empty state is excessively limited while damage caused by the collision is reduced. Further, since the traveling operation of the dump truck 1 in the loaded state is appropriately limited, damage caused by the collision is reduced. Accordingly, even when the loading state of the load of the vessel 3 changes, the dump truck 1 may be operated with high work efficiency while reducing damage caused by the collision.

In the embodiment, the deceleration a of the dump truck 1 is obtained as the variable changed based on the loading state of the load of the vessel 3, the time until the dump truck 1 and the front dump truck 1F collide with each other is estimated based on the deceleration a, and the possibility of the collision is determined. In the embodiment, the collision determination unit 31 estimates the time until the dump truck 1 collides with the front dump truck 1F based on the stop distance passage time Ts and the object arrival time Ta. The stop distance passage time Ts is obtained based on the deceleration a of the dump truck 1 set by the variable setting unit 33 and the traveling speed Vt of the dump truck 1 detected by the traveling state detection device 10. The object arrival time Ta is obtained based on the detection result of the object detection device 12. The collision determination unit 31 may estimate whether the collision with the front dump truck 1F occurs based on the deceleration a set by the variable setting unit 33, the detection result of the traveling state detection device 10, and the detection result of the object detection device 12. Thus, the possibility of the collision may be reliably determined.

According to the embodiment, since the stop distance passage time Ts and the object arrival time Ta are calculated and the possibility of the collision is determined based on the stop distance passage time Ts and the object arrival time Ta, the possibility of the collision may be reliably determined.

Furthermore, in the above-described embodiments, the vehicle body 5 of the dump truck 1 is classified into the front part and the rear part, and an articulate dump truck of which the front part and the rear part are coupled to each other by free joints may be used.

Furthermore, in the above-described embodiments, the dump truck 1 may be used not only in the mining site of the mine, but also, for example, the construction site of the dam.

REFERENCE SIGNS LIST

1 DUMP TRUCK (TRANSPORTER VEHICLE)
2 VEHICLE
2F FRONT PART
2R REAR PART
3 VESSEL
4 TRAVELING DEVICE
5 VEHICLE BODY
5A LOWER DECK
5B UPPER DECK
5C LADDER
5D LADDER
6 VEHICLE WHEEL
6F FRONT WHEEL
6R REAR WHEEL
7 AXLE
7F AXLE
7R AXLE
8 CAB
9 SUSPENSION CYLINDER
9F SUSPENSION CYLINDER
9R SUSPENSION CYLINDER
10 TRAVELING STATE DETECTION DEVICE
10A TRAVELING SPEED DETECTION DEVICE
10B TRAVELING DIRECTION DETECTION DEVICE
10C ADVANCING DIRECTION DETECTION DEVICE
11 LOADING STATE DETECTION DEVICE
12 OBJECT DETECTION DEVICE
13 BRAKE DEVICE
14 STEERING DEVICE
16 DRIVER SEAT
15 TRAVELING DIRECTION OPERATION UNIT
17 RETARDER OPERATION UNIT
18 SPEED STAGE OPERATION UNIT
19 TRAINER SEAT
20 DISPLAY DEVICE
21 ALARM DEVICE
22 POWER GENERATION DEVICE
24 OUTPUT OPERATION UNIT
25 BRAKE OPERATION UNIT
28 RETARDER
29 VEHICLE CONTROL DEVICE
30 CONTROL DEVICE
31 COLLISION DETERMINATION UNIT
32 CALCULATION UNIT
33 VARIABLE SETTING UNIT
34 STORAGE UNIT
35 CONTROL UNIT
36 SPECIFIC DETECTION AREA SETTING UNIT
37 DETERMINATION UNIT
38 INVALIDATION UNIT
40 OPERATION UNIT
80 SPEED CHANGE DEVICE
300 CONTROL SYSTEM
300S COLLISION DAMAGE REDUCTION SYSTEM

400 STATE QUANTITY DETECTION SYSTEM
500 TRAVELING CONDITION ADJUSTMENT SYSTEM
600 PROCESS SYSTEM
1000 SERVER
DPA SOIL DISPOSAL FIELD
HL TRAVELING ROAD
LM LOADING MACHINE
LPA LOADING FIELD
SD SPECIFIC DETECTION AREA
SD1 FIRST PORTION
SD2 SECOND PORTION
SD3 THIRD PORTION
SL DETECTION AREA
WM DRIVER

The invention claimed is:

1. A transporter vehicle comprising:
a vehicle;
an object detection device which includes a detection area at a front side of the vehicle and detects an object at the front side of the vehicle;
a process system which performs a process for reducing damage caused by a collision;
a specific detection area setting unit which sets a specific detection area having a width of a first dimension in a width direction of the vehicle and a length of a second dimension in a traveling direction of the vehicle in the detection area;
a collision determination unit which determines whether the object exists in the specific detection area based on a detection result of the object detection device; and
a control unit which outputs a signal for reducing damage caused by the collision to the process system based on a determination result of the collision determination unit,
wherein the specific detection area setting unit changes a shape of the specific detection area based on a loaded state of a load in a vessel of the vehicle.

2. The transporter vehicle according to claim 1,
wherein the first dimension includes a dimension of a vehicle width of the vehicle.

3. The transporter vehicle according to claim 1,
wherein the specific detection area setting unit changes the shape of the specific detection area based on a traveling condition of the vehicle.

4. The transporter vehicle according to claim 3,
wherein the object detection device is able to detect a relative speed with respect to the object existing in the detection area,
wherein the traveling condition of the vehicle includes the relative speed between the vehicle and the object, and
wherein the specific detection area setting unit changes the length of the specific detection area based on the relative speed.

5. The transporter vehicle according to claim 3, further comprising:
a traveling speed detection device which detects a traveling speed of the vehicle,
wherein the traveling condition of the vehicle includes the traveling speed of the vehicle, and
wherein the specific detection area setting unit changes the length of the specific detection area based on the traveling speed.

6. The transporter vehicle according to claim 3, further comprising:
a traveling direction detection device which detects the traveling direction of the vehicle,
wherein the traveling condition of the vehicle includes the traveling direction of the vehicle, and
wherein the specific detection area setting unit bends the shape of the specific detection area based on the traveling direction.

7. The transporter vehicle according to claim 1, further comprising:
a loading state detection device which detects the loaded state of the load including a weight of the load,
wherein the specific detection area setting unit changes the length of the specific detection area based on the weight of the load.

8. The transporter vehicle according to claim 1,
wherein a determination of the collision determination unit includes a case in which a possibility of the collision is classified into a plurality of levels, and
wherein the specific detection area setting unit classifies the specific detection area into a plurality of portions based on the level.

9. The transporter vehicle according to claim 8,
wherein the process system includes a plurality of process devices capable of performing different processes, and
wherein the control unit outputs the signal to a specific process device based on the level.

10. The transporter vehicle according to claim 9,
wherein the process device includes at least one of an alarm device capable of performing an alarm generation process, a brake device capable of performing a brake process for a traveling device of the vehicle, and a power generation device capable of performing an output reduction process for reducing a driving force for the traveling device of the vehicle.

11. The transporter vehicle according to claim 1,
wherein when the first and second objects exist in the detection area, the specific detection area setting unit sets the first specific detection area and the second specific detection area based on the detection result of the object detection device,
wherein the collision determination unit specifies an object having a high possibility of the collision among the first and second objects, and
wherein the control unit outputs a signal for reducing damage caused by the collision with the object having the high possibility of the collision.

12. The transporter vehicle according to claim 1, further comprising:
an operation device which is disposed in a driving room of the vehicle and is operated by a driver,
wherein the specific detection area is invalidated when the operation device is operated.

13. The transporter vehicle according to claim 1, further comprising:
a steering device capable of changing the traveling direction of the vehicle so that one of a straight movement state and a non-straight movement state changes to the other of the straight movement state and the non-straight movement state,
wherein the specific detection area is invalidated when a change amount in the traveling direction from the straight movement state becomes a predetermined threshold value or more.

14. The transporter vehicle according to claim 1,
wherein the specific detection area is invalidated when a traveling speed of the vehicle becomes a predetermined threshold value or less.

15. The transporter vehicle according to claim 1, further comprising:
a speed change device capable of changing an advancing direction of the vehicle,
wherein the specific detection area is invalidated when the vehicle moves backward.

16. A transporter vehicle comprising:
a vehicle;
an object detection device which includes a detection area at a front side of the vehicle and detects an object at the front side of the vehicle;
a process system which performs a process for reducing damage caused by a collision;
a specific detection area setting unit which sets a specific detection area having a width of a first dimension in a width direction of the vehicle and a length of a second dimension in a traveling direction of the vehicle in the detection area;
a collision determination unit which determines whether the object exists in the specific detection area based on a detection result of the object detection device; and
a control unit which outputs a signal for reducing damage caused by the collision to the process system based on a determination result of the collision determination unit,
wherein the specific detection area includes a first portion, a second portion which is far from the vehicle in relation to the first portion in the traveling direction, and a third portion which is far from the vehicle in relation to the second portion in the traveling direction, wherein a dimension of a width of the first portion is a dimension of a vehicle width of the vehicle, and
wherein a dimension of a width of the third portion is larger than the dimension of the width of the first portion.

17. A transporter vehicle comprising:
a vehicle;
an object detection device which includes a detection area at a front side of the vehicle and detects an object at the front side of the vehicle;
a process system which performs a process for reducing damage caused by a collision;
a specific detection area setting unit which sets a specific detection area having a width of a first dimension in a width direction of the vehicle and a length of a second dimension in a traveling direction of the vehicle in the detection area;
a collision determination unit which determines whether the object exists in the specific detection area based on a detection result of the object detection device; and
a control unit which outputs a signal for reducing damage caused by the collision to the process system based on a determination result of the collision determination unit,
wherein when the vehicle is in one of a loading field or a soil disposal field, the specific detection area is invalidated.

* * * * *